United States Patent [19]
Davis et al.

[11] Patent Number: 6,105,064
[45] Date of Patent: Aug. 15, 2000

[54] SYSTEM FOR PLACING PACKETS ON NETWORK FOR TRANSMISSION FROM SENDING ENDNODE TO RECEIVING ENDNODE AT TIMES WHICH ARE DETERMINED BY WINDOW SIZE AND METERING INTERVAL

[75] Inventors: Howard Davis, Salem; Grant Echols, Payson; Michael Dege, Sandy; B. Gregory Hundley, Lindon; Greg Neath, Orem; Jonathan Richey, Springville, all of Utah

[73] Assignee: Novell, Inc., Provo, Utah

[21] Appl. No.: 08/866,542

[22] Filed: May 30, 1997

[51] Int. Cl.[7] ........................................ G06F 13/00
[52] U.S. Cl. ............................................... 709/224
[58] Field of Search ................... 709/200, 201, 709/209, 217, 218, 219, 220, 221, 223, 224, 225, 232, 233, 234, 235, 246; 370/229, 231, 232, 236, 320, 400, 466

[56] References Cited

U.S. PATENT DOCUMENTS

| | | | |
|---|---|---|---|
| 4,616,359 | 10/1986 | Fontenot | 370/230 |
| 4,677,616 | 6/1987 | Franklin | 370/94 |
| 4,691,314 | 9/1987 | Bergins et al. | 370/94 |

(List continued on next page.)

OTHER PUBLICATIONS

Sharon Fisher, "Can Netware Play in Cyberspace?", *CommunicationsWeek*, Feb. 19, 1996, pp. 42–46.

Doug Bierer et al., NetWare 4 for Professional, (New Riders Publishing 1995), pp. 6–7, 170–171, 195–197.

Andrew S. Tanenbaum, Distributed Operating Systems, (Prentice–Hall, Inc. 1995), pp. 34–42.

Werner Feibel, Novell's® Complete Encyclopedia of Networking, (Novell, Inc. 1995), pp. 727–728, 731–732, 792–794.

"Shell Packet–Burst Support Functional Specification", Revision i, Anonymous, Oct. 19, 1991, pp. 9–1–9–17 (p. 9–12 is missing—page numbering error; two pp. 9–17—page numbering error).

Dave Stevenson et al., An Introduction to Novell's Burst Mode Protocol, *Novell Research*, Novell, Inc., Mar. 1992, pp. 45–75.

Myron Mosbarger et al., "Packet Burst Uptake: BNETX vs. VLM Implementations", *Novell Research*, Novell, Inc., Nov. 1993, pp. 59–80.

*Primary Examiner*—Moustafa M. Meky
*Attorney, Agent, or Firm*—Computer Law++

[57] ABSTRACT

A method for controlling communications between endnodes in a packet-switched computer network includes dynamic window sizing and dynamic packet metering. Dynamic window sizing regularly probes the network to determine whether higher throughput is available at an increased window size, and avoids unnecessary decreases in window size after a packet is dropped or all available data has been transmitted. Dynamic packet metering regularly adjusts the rate at which packets are transmitted in response to changes in the measured propagation rate of packets through the network. To avoid unnecessary ack packets, acks are bundled together and piggybacked on returning data packets when appropriate. The invention provides control even if the address of an endnode changes. The invention also supports multiplexing several logical connections over a single transport session and combining data from several connections in a single packet, as well as construction of packets in a network-layer-independent format.

53 Claims, 2 Drawing Sheets

U.S. PATENT DOCUMENTS

| | | | |
|---|---|---|---|
| 4,736,369 | 4/1988 | Barzilai et al. | 370/231 |
| 4,769,815 | 9/1988 | Hinch et al. | 370/236 |
| 4,949,254 | 8/1990 | Shorter | 709/106 |
| 5,014,265 | 5/1991 | Hahne et al. | 370/60 |
| 5,027,348 | 6/1991 | Curry, Jr. | 370/85.1 |
| 5,029,164 | 7/1991 | Goldstein et al. | 370/235 |
| 5,063,562 | 11/1991 | Barzilai et al. | 370/231 |
| 5,130,986 | 7/1992 | Doshi et al. | 370/231 |
| 5,142,528 | 8/1992 | Kobayashi et al. | 370/79 |
| 5,163,046 | 11/1992 | Hahne et al. | 370/237 |
| 5,191,583 | 3/1993 | Pearson et al. | 370/94.1 |
| 5,193,151 | 3/1993 | Jain | 709/237 |
| 5,226,041 | 7/1993 | Waclawsky et al. | 370/236 |
| 5,247,517 | 9/1993 | Ross et al. | 370/85.5 |
| 5,247,520 | 9/1993 | Geise et al. | 370/94.1 |
| 5,251,205 | 10/1993 | Callon et al. | 370/60 |
| 5,276,677 | 1/1994 | Ramamurthy et al. | 370/232 |
| 5,280,470 | 1/1994 | Buhrke et al. | 370/13 |
| 5,307,351 | 4/1994 | Webster | 370/94.1 |
| 5,323,392 | 6/1994 | Ishii et al. | 370/79 |
| 5,367,523 | 11/1994 | Chang et al. | 370/84 |
| 5,377,327 | 12/1994 | Jain et al. | 370/445 |
| 5,386,412 | 1/1995 | Park et al. | 370/53 |
| 5,400,329 | 3/1995 | Tokura et al. | 370/84 |
| 5,434,860 | 7/1995 | Riddle | 370/84 |
| 5,442,637 | 8/1995 | Nguyen | 371/5.5 |
| 5,446,734 | 8/1995 | Goldstein | 370/397 |
| 5,446,735 | 8/1995 | Tobagi et al. | 370/445 |
| 5,519,699 | 5/1996 | Ohsawa | 370/231 |
| 5,572,528 | 11/1996 | Shuen | 370/85.13 |
| 5,596,574 | 1/1997 | Perlman et al. | 370/389 |
| 5,606,493 | 2/1997 | Duscher et al. | 709/202 |
| 5,668,951 | 9/1997 | Jain et al. | 709/235 |
| 5,675,742 | 10/1997 | Jain et al. | 709/226 |
| 5,754,754 | 5/1998 | Dudley et al. | 714/18 |
| 5,764,625 | 6/1998 | Bournas | 370/229 |
| 5,781,726 | 7/1998 | Pereira | 709/200 |
| 5,793,768 | 8/1998 | Keshav | 370/400 |
| 5,805,818 | 9/1998 | Perlman et al. | 395/200 |
| 5,878,040 | 3/1999 | Peirce, Jr. et al. | 370/389 |
| 5,903,559 | 5/1999 | Acharya et al. | 709/239 |
| 5,912,903 | 6/1999 | Nakayashiki et al. | 709/209 |
| 5,916,309 | 6/1999 | Brown et al. | 710/52 |
| 5,930,233 | 7/1999 | Kanerva et al. | 370/231 |
| 5,940,390 | 8/1999 | Berl et al. | 709/227 |

SYSTEM FOR PLACING PACKETS ON NETWORK FOR TRANSMISSION FROM SENDING ENDNODE TO RECEIVING ENDNODE AT TIMES WHICH ARE DETERMINED BY WINDOW SIZE AND METERING INTERVAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

The present invention relates to communication over a computer network, and more particularly to a approach which employs dynamic window sizing, packet metering, and other techniques to provide an efficient and reliable network transport layer.

TECHNICAL BACKGROUND OF THE INVENTION

Computer networks are often described in terms of an OSI (Open Systems Interconnection) Reference Model which defines seven functional layers. The layers range from a physical layer which carries electrical, optical, or other signals up to an application layer which includes programs that interact directly with human users. The middle layer, known as the transport layer, separates the user-oriented upper layers from the network-oriented lower layers. The transport layer is responsible for dividing data into packets and transporting those packets, with the aid of the network-oriented layers, from a sender to a receiver.

People who design and implement the transport layer of a network generally attempt to balance several competing objectives. Data packets should be transmitted from the sender to the receiver as quickly as possible without congesting the network, without dropping any data packets along the way, and without overflowing the buffer space that holds the packets before the receiver forwards or otherwise processes them. Data packets sometimes travel along different paths through the network, but the data must still be presented to the final receiver in the proper order.

Transport layers face the further challenge that real world networks do not present a consistent environment. The available bandwidth, response time, buffer space, and data loss rates of a typical network change frequently. User-oriented layers above the transport layer may also dictate changes in transport layer behavior by altering packet priorities. A transport layer tries to respond to user requests and to changing network conditions quickly, efficiently, and in a predictable manner.

A variety of transport layers are presently used, including layers which implement TCP (Transmission Control Protocol) and UDP (User Datagram Protocol) on UNIX systems, protocols TP0 through TP4 of the OSI model, SPX (Sequenced Packet Exchange) and IPX (Internet Packet Exchange) in Novell NetWare systems (SPX, IPX, NOVELL, and NETWARE are trademarks of Novell, Inc.), and other protocols.

TCP, TP0 through TP3, and SPX are normally connection-oriented approaches, while IPX, UDP and TP4 support connectionless service. In either form of communication, packets may take different paths between the sender and the receiver. No state is maintained during connectionless communication (other than the transmitted data). Data received is not acknowledged and there is no capability for resending lost data.

By contrast, during connection-oriented communication the endpoints maintain state information to track the results of data transmissions. Unless certain real time protocols are used, receivers also acknowledge the data they receive and senders retransmit data that was not received. The data packets or datagrams used are typically assigned sequence numbers; the receiver places the data back in its original order before presenting it to the application.

TCP and TP0 through TP4 use a window sizing method to control the flow of packets and reduce congestion. A sending endnode on the network has a window size that defines the maximum number of unacknowledged packets allowed. It is assumed that the network will be busy but not congested if the sending endnode is not allowed to send "too many" additional packets before receiving acknowledgments ("acks") that packets sent earlier have indeed reached the receiving endnode. The window size determines how many additional packets is "too many." In some transport layers, the window size is set during initial system configuration and remains fixed thereafter. In other transport layers, an attempt is made to adapt the window size to changing network conditions.

TCP is perhaps the most widely used transport layer protocol, and is the presently favored transport protocol on the Internet. TCP attempts to balance competing transport layer objectives in the following manner. After a connection is established, a maximum sending endnode window size is determined by the receiving endnode and a current sending endnode window size is determined by the sending endnode. The current window size will be less than or equal to the maximum sending window size.

One form of TCP uses a "slow start" method for altering the current window size. Initially, the sending endnode's window size for sending is one packet. After the first data packet is placed on the network by the sending endnode, the window "closes" because the number of unacknowledged packets equals the window size. If all goes well, after one packet round trip time the sending endnode receives an ack from the receiving endnode. At this point the window opens again, and the window size might be increased.

The slow start method increases window size rapidly up to a threshold and then slowly thereafter. The "slow" in "slow start" refers to the fact that the initial small window sizes only allow relatively slow data transmission. Slow increases in window size increment the window size once for each group of several acks received, while rapid increases increment the window size by one for each ack received. In either case, the window size is increased until one of the following occurs: a predefined maximum window size is reached, a packet is lost, or there is no more data ready to send.

If no packets are lost and the predefined maximum window size is not too large and a steady flow of data is ready to send, then TCP will reach a steady state. In the steady state, one new data packet is placed on the network for transmission each time an ack is received. The time lapse between each packet transmission is determined by the rate at which acks arrive at the sending endnode. As long as the network bandwidth and latency remain consistent, this steady pacing of packets helps avoid congestion and minimizes the risk that packets will be lost through buffer overflows.

However, many networks do not have constant bandwidth and latency, and some do not have equal latency in both directions. In some network environments, such as satellite channels, data is bunched together and then transmitted in a burst. Similar bunching may occur on heavily loaded public networks that use frame relay methods. In such cases, acks will be compressed in bunches with large gaps between each bunch. TCP relies on continuous data and ack transfers for best performance. When ack compression causes acks to arrive in bursts, TCP does not efficiently use the available bandwidth between the bursts.

TCP performance depends heavily on choosing an appropriate value for the threshold and the maximum window size. If either the maximum window size or the threshold is too small, then TCP will place less data on the network than it should for optimum performance.

If the predefined maximum window size is too large, then TCP will drop packets, overload the network, or both. The current window size will grow toward the maximum window size until it exceeds the window size that is optimal for the link and TCP will then place "extra" packets on the network. Extra packets are those which overload the network by exceeding the optimal number of packets given the available bandwidth and buffer space. What happens as a result of the extra packets depends on whether buffer space is available at nodes between the sending endnode and the receiving endnode.

If the slowest node in the route between the sending endnode and the receiving endnode does not have enough buffer space to hold the extra packets, it will drop the packets. Dropped packets cause TCP to go through a time-out and retransmit process. Dropped packets also cause a reduction in window size; some versions of TCP reduce the window size by half for each dropped packet, while others simply start over with a current window size of one. In either version, the dropped packet causes TCP to repeat the cycle of growing the window size, placing extra packets on the network, dropping a packet, reducing the window size, and repeating the cycle. This cycle severely reduces packet throughput.

If the slowest intermediate node does have enough buffer space to hold the extra packets, it will not drop the packets. However, the network will be congested because the extra packets will precede packets transmitted by other sending endnodes. Moreover, if enough packets from other sending endnodes arrive at the slow intermediate node, those other packets will be dropped, causing the throughput-reducing cycle described above.

TCP performance also depends heavily on the method used for altering window size. For instance, when there is no more data ready to send, TCP sets the current window size back to one and starts increasing it once more toward the predefined maximum. If the window size were still at or near the maximum when data became available, packets would be placed on the network in rapid succession until the window closed. Such a sudden burst of packets could cause congestion that interferes with other network users, and packets at the end of the burst might be dropped. As noted, recovery from dropped packets seriously degrades network performance. Accordingly, the window size is reset to one each time the available data has all been transmitted.

Unfortunately, resetting the window size to one for each new block of data prevents TCP from fully utilizing the available bandwidth when data is intermittent. Common configurations that generate intermittent data include distributed operating systems, message passing systems, remote procedure calls, distributed database locks, distributed file systems, client/server cache consistency protocols, other request/reply data, and other data that is created in response to distributed events. TCP does not provide optimal throughput for such data because the data tends to arrive at the TCP layer intermittently rather than continuously, forcing the window size reset to one and the resulting waste of bandwidth.

Some transport layers use a "packet metering" protocol instead of a window sizing protocol. Unlike window sizing, which limits the number of unacknowledged packets allowed, packet metering limits the rate at which packets are placed on the network for transmission. Packet metering assumes that the network will be busy but not congested if the sending endnode is not allowed to send packets "too quickly." The packet metering rate determines how quickly is "too quickly." In some transport layers, the packet metering rate is set during initial system configuration and remains fixed thereafter. In other transport layers, an attempt is made to adapt the metering rate to changing network conditions.

Window sizing and packet metering have different advantages relative to one another. If the metering rate is set correctly, packet metering prevents bursts caused by intermittent availability of data. As noted above, TCP window sizing avoids congestion but also wastes bandwidth by starting each new block of data with a small window size. By contrast, optimal packet metering transmits newly arrived data at a rate that does not cause congestion or packet dropping without wasting bandwidth. Properly metered packets are transmitted at the highest rate possible without flooding the network.

However, one advantage of window sizing relative to packet metering is that window sizing tends to provide better limits on the number of extra packets that are transmitted after packets are dropped. Window sizing stops placing packets on the network immediately when an expected ack does not arrive. By contrast, packet metering relies on rate measurements taken with respect to two or more packets and thus responds more slowly to missing acks. In one packet metering system, for example, information regarding both the rate at which packets arrive at the receiving endnode and the rate at which they are removed from the receiving endnode's buffer for processing is transmitted to the sending endnode at intervals. During such an interval, extra packets continue to be placed on the network.

Many existing transport layers are statically configured with parameters such as a maximum window size, a slow start threshold separating rapid window growth from slower window growth, or a default packet metering rate. These transport layers respond inadequately to changing network conditions. As noted above, neither window sizing nor packet metering systems perform well if their defining parameters do not match network conditions.

Unfortunately, it is difficult even for network administrators to determine which window sizing or packet metering parameter values to use in a given network. The network may include a variety of environments, such as Ethernet, satellite, FDDI, modem, token ring, and so on. At a minimum, the administrator must understand how TCP and other protocols used work in each network environment, must know how to configure systems by installing parameter values in them, and must have the tools needed to analyze network behavior. Knowing the maximum buffer space available on each intermediate node is also very helpful. These prerequisites may be difficult to obtain.

But even when such tools and information are available, the administrator faces the harsh reality that most network environments change frequently. Traffic generated by users changes the available network bandwidth and hence the optimum window size or packet metering rate. Nodes come up and nodes go down. Hardware is exchanged for other hardware that has a different buffer size. New links having different packet propagation characteristics are added, as when satellite links are first connected to a network. Such changes often make particular maximum window sizes or metering rates obsolete soon after they are installed.

The TCP slow start protocol attempts to overcome the drawbacks of static configurations by altering the window size in response to changes in the network. As described above, however, this attempt is not entirely successful because slow start depends on statically configured parameters such as the threshold and maximum window sizes and because window sizing does not use bandwidth efficiently when data is supplied intermittently.

Thus, it would be an advancement in the art to provide a novel method for controlling packet transmissions which responds efficiently to changing network conditions.

It would also be an advancement to provide such a method which combines positive aspects of window sizing and packet metering.

Because of the enormous investment in existing networks, it would be a further advancement to provide such a method which can be used by simply replacing the transport layer of an existing network with a transport layer that implements the novel method.

Such a method for controlling communication over a computer network is disclosed and claimed herein.

BRIEF SUMMARY OF THE INVENTION

The present invention provides a method for controlling communication in a computer network. More specifically, the present invention provides several protocols for controlling data packets at the transport layer or other packet transmission layer. Each protocol uses dynamic window sizing or dynamic packet metering techniques in response to changing network conditions. One protocol also combines dynamic window sizing and dynamic packet metering in an effective manner.

According to one method of the present invention, a maximum send window size is determined by a receiving endnode and a current send window size is determined by a sending endnode. The current send window size will not exceed the maximum send window size; two is used as an initial value in one embodiment but other send window sizes are also suitable. A current interpacket gap interval is also determined by the sending endnode; zero is used as an initial value in one embodiment but other interpacket gap intervals are also suitable.

When data is ready to be sent, the first two packets are placed on the network for transmission. The second packet is marked to indicate that it follows the first packet at a delay equal to the current interpacket gap interval, which is zero time increments. Because two packets are now outstanding and the current send window size is two, the window then closes.

The "first two" packets in question are the first two data carrying packets of the session. Interpacket gap is only measured when multiple packets are ready to send at the same time. Each packet that is sent at the current interpacket gap time interval after the preceding packet is marked with timing information by the sending end node 32. Single packets, and the first packet in a series of packets, are not marked and are used by the receiving endnode 34 only to set the start time for a gap in case the next packet to arrive in order is marked.

The receiving endnode uses different conditions to trigger the return of an ack to the sending endnode, one of which is receipt of a window update size number of unacknowledged packets. Initially, the window update size is set to one, so each of the first two data packets is acknowledged soon after it arrives at the receiving endnode.

The receiving endnode also measures the time gap between receipt of the first data packet and receipt of the second data packet, and stores this value as the current average interpacket gap. Whenever the average interpacket gap value changes significantly, the receiving endnode informs the sending endnode of the new value.

When the sending endnode receives an ack, it may increase or decrease its current send window size. Changes in the send window size are directed toward finding a best window size at which the highest packet throughput is achieved. During an initial connection startup phase, possible send window sizes are probed. During each probing step, the current window size is allowed to grow several packets larger than the current best window size until throughput no longer increases. The current window size is then reset to the window size which provided the maximum throughput; that window size accordingly becomes the current best window size. The throughput is preferably monitored for a lack of increase rather than a decrease because a larger than optimum window size may temporarily allow the same throughput as the optimum size if intermediate nodes have enough buffer space to postpone packet losses.

During normal operation after the startup phase, the probing step is repeated to determine whether the best send window size has changed. In one embodiment, probing is initiated after each ack is received, unless probing is already in progress. In another embodiment, probing is initiated each time the send window closes. Other embodiments initiate probing based on the number of packets sent or the expiration of a time-out period.

The current send window size is decreased if packets are dropped or if the receiving endnode sends a congestion notice to the sending endnode. In one embodiment, the current send window size is reset to the previous best window size each time one of these events occurs. In another embodiment, the current send window is decreased by a factor, such as one-half. In either case, however, probing continues after the decrease to adapt the best send window size to changes in the network environment.

As noted, in one method according to the present invention the receiving endnode notifies the sending endnode when the average interpacket gap changes significantly. In response, the sending endnode imposes a delay slightly less than the average interpacket gap between data packet transmissions. Thus, this method of the present invention combines a novel form of dynamic window sizing with a novel form of packet metering.

In addition to using the window update size discussed above, the receiving endnode uses occurrence of an acknowledgment update event, such as expiration of a time interval or receipt of a certain number of packets, to trigger the return of an ack to the sending endnode. Acks may also be "piggybacked" on data packets transmitted from the receiving endnode to the sending endnode. Piggybacking reduces the number of packets transmitted by eliminating the need for some "control" packets that only carry an ack or other control information. Piggybacking control information on top of data packets reduces the network load without unduly compromising efficient control or adaptation to changing network conditions.

In addition to methods, the present invention also covers related systems and articles of manufacture for controlling network communications. The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the Figures wherein like parts are referred to by like numerals. The section headings below are for convenience only. The material under a given section heading is not necessarily the only material herein on that topic, nor is it necessarily limited only to material on that topic.

Overview of Network Components

Figure 1:
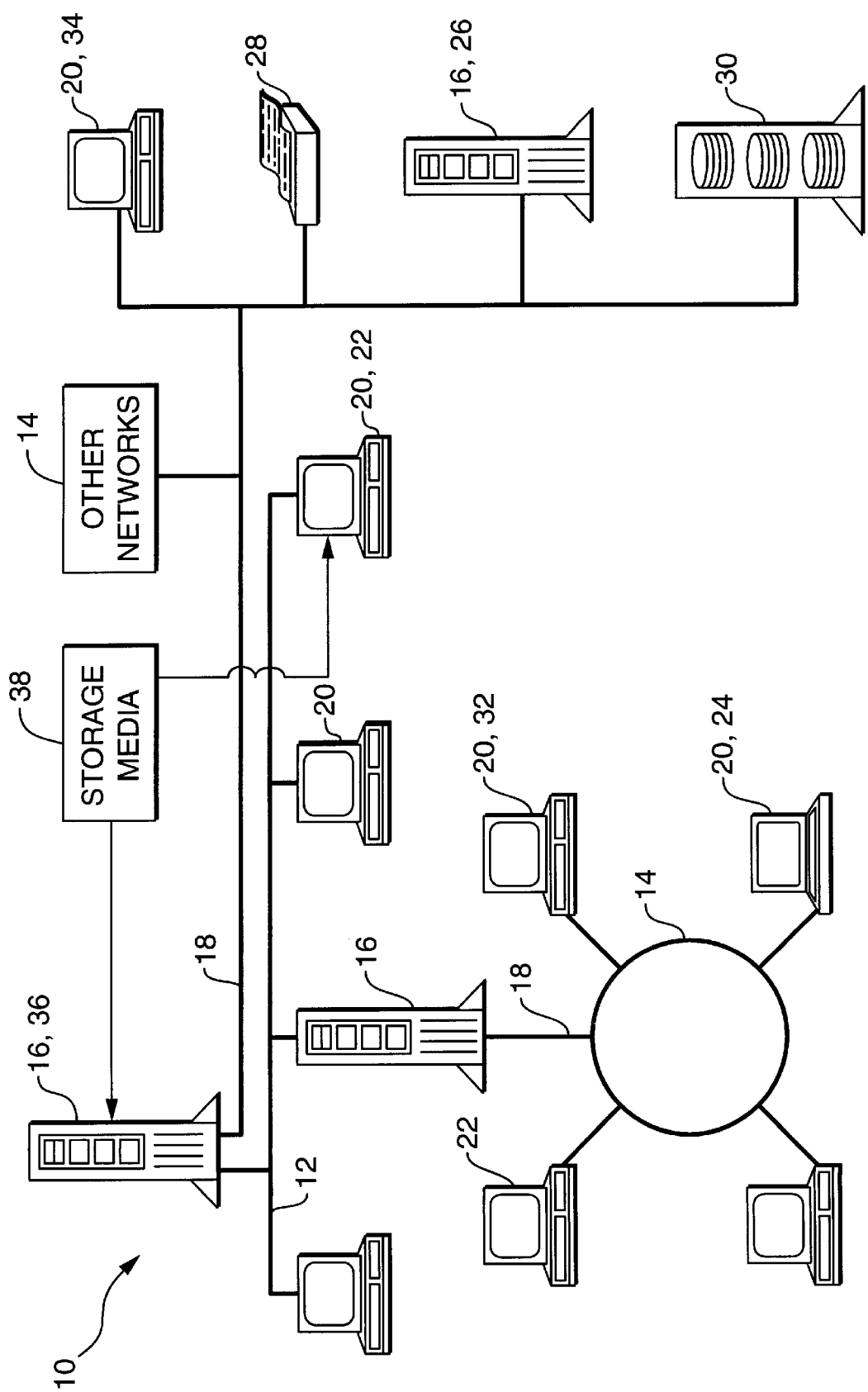
FIG. 1 is a schematic illustration of a computer network suitable for use with the present invention.

The present invention provides a method for controlling communication in a computer network. One of the many computer networks suited for use with the present invention is indicated generally at 10 in FIG. 1. In one embodiment, the network 10 includes Novell NetWare® network operating system software, version 4.x (NetWare is a registered trademark of Novell, Inc.). In alternative embodiments, the network includes NetWare Connect Services, VINES, Windows NT, LAN Manager, or LANtastic network operating system software (VINES is a trademark of Banyan Systems; NT and LAN Manager are trademarks of Microsoft Corporation; LANtastic is a trademark of Artisoft) and/or an implementation of a distributed hierarchical partitioned object database according to the X.500 protocol, such as Novell Directory Services software.

The network 10 may include a local area network 12 which is connectable to other networks 14, including other LANs, WANs, or portions of the Internet, through a gateway or similar mechanism. "Internet" as used herein includes variations such as a private Internet, a secure Internet, a value-added network, a virtual private network, or an intranet.

The system 10 includes several servers 16 that are connected by network signal lines 18 to one or more network clients 20. The servers 16 and network clients 20 may be configured by those of skill in the art in a wide variety of ways to operate according to the present invention. The servers 16 may be configured as Internet servers, as intranet servers, as directory service providers or name servers, as software component servers, as networked peers, or as a combination thereof. The servers 16 may be uniprocessor or multiprocessor machines. The servers 16 and clients 20 each include an addressable storage medium such as random access memory and/or a non-volatile storage medium such as a magnetic or optical disk or ROM (read-only memory).

Suitable network clients 20 include, without limitation, personal computers 22, laptops 24, workstations 26, and dumb terminals. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the system 10.

A given computer may function both as a client 20 and as a server 16; this may occur, for instance, on computers running Microsoft Windows NT software. A given computer may also function as a peer in a peer-to-peer network according to the present invention. Although particular individual and network computer systems and components are shown, those of skill in the art will appreciate that the present invention also works with a variety of other networks and computers.

The network 10 includes a sending endnode 32 and a receiving endnode 34. A server 16 or a device such as a router or a bridge may act as an intermediate node 36 between the sending endnode 32 and the receiving endnode 34. Specific computers are designated in FIG. 1 as the sending endnode 32 and the receiving endnode 34 solely for purposes of illustration. In alternative embodiments, different computers assume the sending and receiving roles. In particular, either endnode may be a server 16 or a network client 20 or a peer. A given computer may also simultaneously send to a second computer and receive from a third computer.

The servers 16 and the network clients 20 are capable of using floppy drives, tape drives, optical drives or other means to read a storage medium 38. A suitable storage medium 38 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein.

Thus, the medium 38 tangibly embodies a program, functions, and/or instructions that are executable by the sending endnodes 32, intermediate nodes 36, and/or receiving endnodes 34 to perform network communication steps of the present invention substantially as described herein.

Overview of Network Communication Methods

Figure 2:
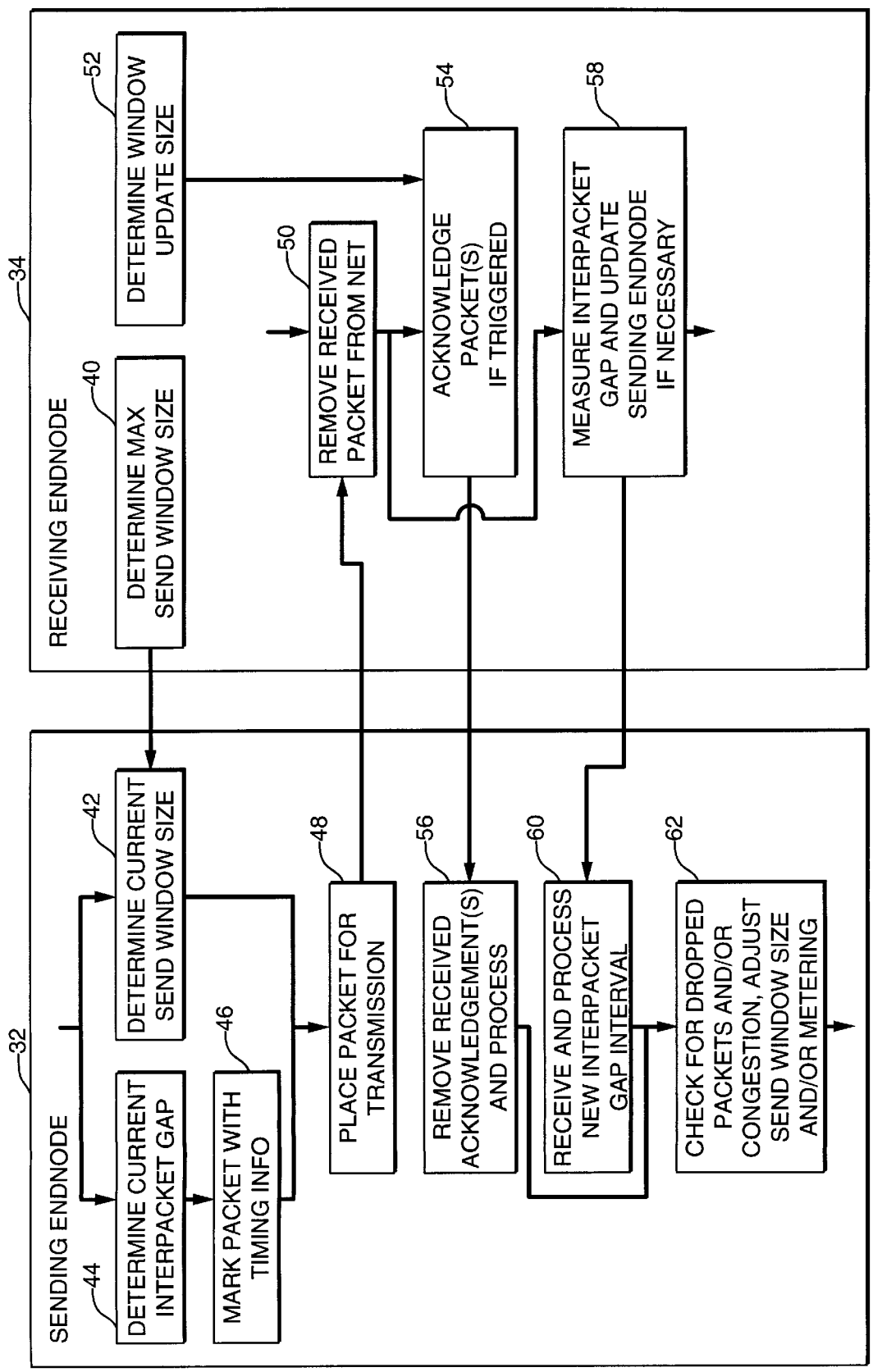
FIG. 2 is a diagram illustrating steps involved in communication and coordination between two endnodes in the computer network according to the present invention.

Methods of the present invention will now be described by reference to FIG. 2 as well as illustrative computer program code and explanations. The left column of FIG. 2 illustrates steps taken by the sending endnode 32, while the right column illustrates steps taken by the receiving endnode 34. In general, time progresses as one moves from the top of FIG. 2 toward the bottom of the figure.

As explained further below, the sending endnode 32 and the receiving endnode 34 support network communication by controlling data packet transmission. The endnodes 32, 34 use dynamic window sizing and/or dynamic packet metering techniques in response to changing network conditions. Reference is made throughout the following discussion to both FIG. 1 and FIG. 2.

Sessions

In one embodiment, the sending endnode 32 and the receiving endnode 34 contain software controlling a computer as a means for establishing a network communication session, for monitoring such sessions, for determining whether there are any active sessions, for delaying termination of a session to avoid the overhead of rescheduling if more transfers happen, for identifying lost sessions, for attempting to reestablish lost sessions, and for otherwise managing sessions.

The term "session" refers to a guaranteed delivery communication channel set up between the two endnodes 32 and 34. Data from many connections can be multiplexed over the same session. As discussed below, measurements such as round trip time, data throughput, and interpacket gap are preferably made on the session, as session measurements are more accurate than measurements computed on each connection. This approach also allows the measurements to be remembered even if connections come and go.

The term "connection" refers to the communications channel established between a service on one endnode and a corresponding service on another endnode. It is possible for the same service to set up several connections which can be used for sending different types of data, or sending data at different priorities between the endnodes. It is also possible for services to set up multiple connections to several different endpoints at the same time. Services can preferably set up (and tear down) as many connections as they like, as often as they like. If multiple connections from the same or different services are carrying data between the same two endnodes, then those connections will often be multiplexed over a single session.

The term "service" refers to a category of application or other software that uses an embodiment of the invention to communicate with other applications or programs. A service may be an application which has registered itself with the embodiment under a given name and service type. The embodiment uses this registry of names and service types when connections are being established. During connection, an application on one endnode will register itself as a service, a second application on the same or another endnode asks to connect to that name and service type, and the embodiment sets up the connection.

A "message" is the data unit that a service wants to send over a connection. A "packet" is the data unit that is actually carried on the network. Network hardware limits the size of packets. A message can be bigger or smaller than the maximum packet size allowed by the network hardware. If the message is bigger, then ACP (an embodiment of the invention) will split the message into several packets for transmission and reassemble the message on the receiving endnode 34. If the message is smaller than the maximum packet size allowed by the network hardware, ACP may combine that message with other messages which are also being sent over the same session to the receiving endnode 34.

"Board" refers to a physical adapter over which data can be transmitted. One embodiment of the invention tracks the number of packets it has queued to each of the physical hardware adapters in the machine so that it can limit the number of unsent packets that are queued at a board. Because hardware boards frequently transmit packets much slower than the computer CPU can assemble them, it is possible for queuing to get far ahead of transmission. The embodiment stops assembling packets for transmission when it gets several packets ahead of the hardware. This allows the embodiment to do optimizations such as combining late arriving data with previous data in the same packet, and making sure that piggybacked acknowledgment information is as accurate as possible.

In one embodiment, sessions, connections, and services are managed using routines and structures such as the following:

```
#define MINIMUM_RETRY_DELAY                              200
#define MINIMUM_DUPLICATE_DELAY                          100
/* History samples kept (must be divisible by two) */
#define NUMBER_OF_LONGEST_ROUND_TRIP_SAMPLES             100
#define NUMBER_OF_THROUGHPUT_SAMPLES                     4
#define NUMBER_OF_SMALLEST_RECEIVE_GAP_SAMPLES           4
#define RECEIVE_CONGESTION_THRESHOLD                     25
#define MINIMUM_PACKETS_IN_RECEIVE_GAP_SAMPLE            15
#define DEFAULT_MAXIMUM_RETRIES                          20
/* The network address types are defined 1 based, so add 1 */
#define MAX_NETWORK_TYPES                                (4 + 1)
/* TODO: figure out the best minimum segment size */
#define MINIMUM_LOOKAHEAD_DATA_SIZE                      20
#define MINIMUM_PACKET_FRAGMENT_SIZE                     128
#define MINIMUM_WINDOW_SIZE                              2
#define INITIAL_MAXIMUM_SEND_WINDOW_SIZE MINIMUM_WINDOW_SIZE
#define INITIAL_MAXIMUM_RECEIVE_WINDOW_SIZE              64
#define SESSION_TEARDOWN_DELAY_INTERVAL                  500
#define SEND_SYSTEM_MESSAGE                              0
#define DELAY_SYSTEM_MESSAGE                             1
#define SERVICE_INDEX_GROW_COUNT                         5
#define CONN_INDEX_GROW_COUNT                            10
#define SESSION_INDEX_GROW_COUNT                         5
#define HIGH_RES_TO_MILLISECOND_RATIO     (1000000L / 838L)
#define TIMER_MILLISECOND_GRANULARITY     55
#define TIMER_HIGH_RES_GRANULARITY        (55 * HIGH_RES_TO_MILLISECOND_RATIO)
#define MINIMUM_SAMPLE_TIME               (1000 *
HIGH_RES_TO_MILLISECOND_RATIO)
#define TRANSMIT_SAMPLE_TIME              (1000 *
HIGH_RES_TO_MILLISECOND_RATIO)
```

-continued

```
extern UINT32 buffersInUse;
extern UINT32 maximumTransmitsNotCompleted;
extern UINT32 receiveCongestionThreshold;
extern struct BoardStruct *registeredBoardListHead;
extern struct BoardStruct *boardsWaitingToSend;
extern UINT32 sessionMaintenanceEsrScheduled;
extern UINT32 timedSessionEsrScheduled;
extern FEB processPacketsEvent;
extern UINT32 processPacketsScheduled;
extern UINT32 packetsOnReceiveQueue;
extern NiosAESECB timedSessionEcb;
extern struct SessionStruct *timedSessionsHead;
extern struct SessionStruct *timedSessionsTail;
struct ServiceStruct
{
    UINT8 *serviceName;
    UINT8 *serviceType;
    UINT32 (*ConnectRequestReceived) (
            UINT32 connectionHandle,
            UINT32 *userConnectionNumber);
    struct ConnectionCallBackTable *connectionCallBack;
};
#define STATUS_INITIALIZING            1
#define STATUS_NORMAL                  2
#define STATUS_TERMINATING             3
struct ConnectionStruct
{
    UINT32 status;
    struct SessionStruct *session;
    UINT32 myConnectionNumber;
    UINT32 remoteConnectionNumber;
    UINT32 userConnectionNumber;
    UINT32 flags;
    struct ConnectionCallBackTable *connectionCallBack;
    UINT32 sendMessageNumber;
    UINT32 sendMessageOffset;     /* Set to zero on message removal */
    UINT32 sendCurrentFragment;   /* Only valid if sendMessageOffset != 0 */
    UINT32 sendFragmentOffset;    /* Only valid if sendMessageOffset != 0 */
    struct MessageBlock *sendMessageHead;
    struct MessageBlock *sendMessageTail; /* Undefined if head is NULL */
    /* Fields for receiving a message */
    UINT32 receiveMessageNumber;
    struct MessageBlock *receiveHead;
    UINT32 receiveFragment;
    UINT32 receiveOffset;
    UINT32 numberOfReceiveBuffersHeld;
    struct ConnectionStruct *nextSendLink; /* NULL if not linked on send
list */
    UINT8 *myServiceName;
    UINT8 *myServiceType;
    UINT8 *peerServiceName;
    UINT8 *peerServiceType;
};
extern NiosAESECB sessionMaintenanceEcb;
struct HistoryStruct
{
    UINT32 value;
    UINT32 recentValue;
    UINT32 numberOfSamples;
    UINT32 samplesToKeep;
};
struct SessionStruct
{
    UINT32 status;
    UINT32 numberOfActiveConnections;
    struct BoardStruct *board;
    struct ConnectionStruct *connectionsWaitingToSend;
    UINT32 uniqueID;
    UINT32 mySessionNumber;
    UINT32 remoteSessionNumber;
    struct SessionStruct *nextSendLink;
    /* Active session fields */
    struct SessionStruct *nextTimedSession;
    struct SessionStruct *previousTimedSession;
    /* System message fields */
    UINT32 nextSystemRequestNumber;
    struct SendBuffer *systemMessageSendHead;
    struct SystemRequestStruct *systemMessageWaitForReply;
    UINT32 sendSequence; /* Sequence of the last packet sent */
```

-continued

```
    UINT32 sendLastAcked; /* Sequence acked by my peer */
    UINT32 receiveSequence; /* Sequence of the last packet received */
    UINT32 receiveLastAcked; /* Sequence acked to my peer */
    UINT32 flags;
    UINT32 ackPostedTime;
    struct NetworkCallBackTable *networkCallBack;
    /* Send information */
    struct SendBuffer *unackedPacketsHead;
    struct SendBuffer *unackedPacketsTail; /* Undefined if head is NULL */
    UINT32 maximumSendWindowSize;
    UINT32 maximumEndpointPacketSize;
    UINT32 maximumRouteablePacketSize;
    /* Send gap */
    UINT32 sendGap;
    UINT32 packetGapStartTime;
    struct SessionStruct *meterDelayLink;
    /* Receive information */
    struct ReceiveBuffer *buffersReceivedOutOfOrder;
    UINT32 maximumReceiveWindowSize;
    UINT32 lastReceiveTime;
    UINT32 numberOfMeteredPacketsReceived;
    UINT32 totalMeteredReceiveGapTime;
    void *networkInfo;
    /* Round trip measurement */
    UINT32 lastRoundTripUpdateTime;
    UINT32 numberOfRoundTripMeasurments;
    UINT32 totalRoundTripMeasurmentTime;
    UINT32 averageRoundTripTime;
    struct HistoryStruct longestRoundTripTime;
    /* Transmit throughput measurement */
    UINT32 transmitStartTime;
    UINT32 bestSendWindowSize;
    struct HistoryStruct bestThroughput;
    UINT32 transmitTimeElapsed;
    UINT32 messageBytesTransmittedSinceSample;
    /* Send window adjustment statistics */
    UINT32 maximumWindowSizeGrowAmount;
    UINT32 maximumWindowGrowthAboveBest;
    UINT32 targetMaximumWindowGrowthAboveBest;
    UINT32 sampleState;
    UINT32 sampleCount;
    UINT32 sendWindowSize;
    struct HistoryStruct lowestReceiveGap;
    /* Ack controls */
    UINT32 myWindowUpdateThreshold;
    UINT32 peerWindowUpdateThreshold;
    UINT32 delayedAckTimeInterval;       /* Send to other side */
    UINT32 lastAckTime;
    UINT32 minimumDuplicateAckInterval;
    /* Nak controls */
    UINT32 minimumDelayedNakTimeInterval;
    UINT32 maximumDelayedNakTimeInterval;
    UINT32 outOfOrderCount;
    UINT32 lastNakTime;
    UINT32 minimumDuplicatePacketInterval;
    /* LIP controls */
    UINT32 LIPLastTransmitTime;     /* non-zero means LIP is active */
    UINT32 LIPPacketSize;
    UINT32 LIPRetryCount;
    /* Timeout retransmit controls */
    UINT32 retransmitTimeInterval;
    UINT32 maxRetransmitCount;
    UINT32 retransmitRetryCount;
#if DebugVersion
    /* Variables used for debug statistics */
    UINT32 totalNumberOfWindowCloses;
    UINT32 totalNumberOfMessageBytesTransmitted;
    UINT32 nakVerbsReceived;
    UINT32 receiveGap;
    UINT32 totalPacketsSent;
    UINT32 totalPacketsReceived;
    UINT32 missingPacketsArrivingBeforeNak;
    UINT32 missingPacketsArrivingAfterNak;
    UINT32 nakPacketsSent;
    UINT32 nakSequencesSent;
    UINT32 selectiveAckSequencesSent;
    UINT32 delayedAckPackets;
    UINT32 duplicateAckPackets;
    UINT32 windowUpdateAckPackets;
```

-continued

```
        UINT32 piggybackedAcks;
        UINT32 nakNotSent;
        UINT32 selectiveAckNotSent;
        UINT32 nakNotRetransmitted;
        UINT32 smallestSendWindowSize;
        UINT32 largestSendWindowSize;
        UINT32 congestionNoticesSent;
        UINT32 congestionNoticesReceived;
        UINT32 messageBytesReceived;
        UINT32 numberOfGapsInserted;
        UINT32 lastPeerReceiveGapInterval;
        UINT32 lastTransmitRate;
        UINT32 totalOutOfOrderPackets;
        UINT32 duplicateProcessedPacketsDiscarded;
        UINT32 duplicateUnprocessedPacketsDiscarded;
        UINT32 totalNakRetransmitCount;
        UINT32 totalTimeOutRetransmitCount;
        UINT32 unackedTransmits;
#endif
};
/* Sample state defines */
#define SAMPLES_BELOW_BEST      1
#define SAMPLES_AT_BEST         2
#define SAMPLES_ABOVE_BEST      3
struct BoardStruct
{
        struct BoardStruct *nextBoardLink;
        struct BoardStruct *nextSendLink;
        UINT32 waitingForTransmitCompleteFlag;
        UINT32 boardNumber;
        UINT32 transmitsNotCompleted;
        struct SessionStruct *sessionsWaitingToSend;
#if DebugVersion
        UINT32 numberOfTransmitWaits;
#endif
};
/* Session flags definitions */
#define NEW_NAK_PENDING                     0x00000001
/* Only valid when outOfOrderCount is non-zero */
#define WINDOW_IS_CLOSED                    0x00000002
#define WINDOW_CLOSED_SINCE_ACK             0x00000004
#define RECEIVE_CONGESTION_OCCURING         0x00000008
#define METER_START_TIME_SET                0x00000010
#define LAST_RECEIVE_WAS_RETRANSMITTED      0x00000020
#define SESSION_IS_BEING_TIMED              0x00000040
#define METER_DELAY_SCHEDULED               0x00000200
//** #define ACK_WAS_RECEIVED                0x00000080
//** #define WINDOW_ALMOST_CLOSED            0x00000100 // prefer counter?
extern modHandle mh;
extern UINT32 sizeOfConnIndex;
extern struct ConnectionStruct *((*connIndex)[ ]);
extern UINT8 (*connUniqueID)[ ];
extern UINT32 sizeOfSessionIndex;
extern struct SessionStruct *((*sessionIndex)[ ]);
extern UINT8 (*sessionUniqueID)[ ];
extern struct NetworkCallBackTable *(registeredNetworks[ ]);
extern UINT32 registeredNetworkAddressSize[ ];
extern UINT32 maxNetworkAddressSize;
struct SessionStruct *StartNewSession(
            struct GeneralHeader *generalHeader,
            struct ReceiveBuffer *buffer)
{
        struct CreateSessionRequest *request;
        struct CreateSessionReply *reply;
        struct SendBuffer *sendBuffer;
        struct NetworkAddressStruct *networkAddress;
        struct SessionStruct *session;
        UINT32 ccode, maximumPacketSize;
        Allocate *networkAddress.
        Get the address this request came from; validate packet.
        Allocate session request.
        Remove the create session verb so the verb switch won't process it.
        generalHeader->numberOfVerbs--;
        LocateOrCreateSession(networkAddress, &session, TRUE,
                    request->requestNumber);
        session->remoteSessionNumber = request->sessionNumber;
        session->maximumSendWindowSize = request->maximumReceiveWindowSize;
        maximumPacketSize = session->maximumEndpointPacketSize;
        if (request->maximumPacketSize < session->maximumEndpointPacketSize)
```

-continued

```
{
#if DebugVersion
        Debug(DEB_ALWAYS) "Reducing maximum packet size from %u to peers "
                "maximum of %u\r\n", session—
>maximumEndpointPacketSize,
                request->maximumPacketSize);
#endif
        session->maximumEndpointPacketSize = request->maximumPacketSize;
        session->maximumRouteablePacketSize = request->maximumPacketSize;
        session->networkCallBack->SetMaximumRouteablePacketSize(
                session->networkInfo, session—
>maximumRouteablePacketSize,
                sizeof(struct GeneralHeader));
    }
    NiosFree(mh, networkAddress);
    Check to see if the versions are compatible.
    Generate the create session reply.
    reply->verbNumber = CREATE_SESSION_REPLY_VERB;
    reply->requestNumber = request->requestNumber;
    reply->ccode = 0;
    reply->sessionNumber = session->mySessionNumber;
    reply->versionNumber = ACP_VERSION_NUMBER;
    reply->maximumPacketSize = maximumPacketSize;
    reply->maximumReceiveWindowSize = session->maximumReceiveWindowSize;
    ReleaseSystemMessageBuffer(session, sendBuffer, DELAY_SYSTEM_MESSAGE);
    return (session);
}
UINT32 LocateOrCreateSession(
        struct NetworkAddressStruct *networkAddress,
        struct SessionStruct **session,
        UINT8 createRequestedByPeer,
        UINT32 uniqueID)
{
    struct SessionStruct *newSession;
    NDateTime dateTime;
    UINT32 ccode, index, boardNumber, transmitTime;
    struct SendBuffer *sendBuffer;
    struct CreateSessionRequest *request;
    See if a session with this network address already exists.
    newSession = LocateSession(networkAddress);
    if (newSession != NULL)
    {
        if (createRequestedByPeer)
        {
            if (newSession->uniqueID == uniqueID)
            {
                /* This is a duplicate create request, ignore it */
                return (ACP_DUPLICATE_CREATE_SESSION_REQUEST);
            }
            RemoveSession(newSession, ACP_PEER_REINITIALIZED);
        }
        else
        {
            *session = newSession;
            return (ACP_SUCCESS);
        }
    }
    /* We need to build a new session structure */
    newSession = NiosLongTermAlloc(mh, sizeof(struct SessionStruct));
    /* Fill in the session structure fields */
    newSession->status = STATUS_NORMAL;
    newSession->numberOfActiveConnections = 0;
    /* NOTE: board gets filled in later */
    newSession->connectionsWaitingToSend = NULL;
    newSession->uniqueID = uniqueID;
    /* NOTE: mySessionNumber gets filled in later */
    /* NOTE: remoteSessionNumber gets filled in later */
    newSession->nextSendLink = NULL;
    /* Active session fields */
    newSession->nextTimedSession = NULL;
    newSession->previousTimedSession = NULL;
    /* System message fields */
    NiosGetDateTime(&dateTime);
    newSession->nextSystemRequestNumber = NiosGetHighResIntervalMarker( ) ^
            ((UINT32 *)&dateTime)[0] ^ ((UINT32 *)&dateTime)[1];
    newSession->systemMessageSendHead = NULL;
    newSession->systemMessageWaitForReply = NULL;
    newSession->sendSequence = -1;
    newSession->sendLastAcked = -1;
```

-continued

```
        newSession->receiveSequence = -1;
        newSession->receiveLastAcked = -1;
        newSession->flags = 0;
        /* ackPostedTime does not need to be initialized */
        newSession->networkCallBack = registeredNetworks[
                networkAddress->addressType];
        /* Send information */
        newSession->unackedPacketsHead = NULL;
        newSession->unackedPacketsTail = NULL;
        newSession->maximumSendWindowSize = INITIAL_MAXIMUM_SEND_WINDOW_SIZE;
        /* maximumEndpointPacketSize gets filled in later */
        /* maximumRouteablePacketSize gets filled in later */
        /* Send gap */
        newSession->sendGap = 0;
        /* packetGapStartTime does not need to be initialized */
        newSession->meterDelayLink = NULL;
        /* Receive information */
        newSession->buffersReceivedOutOfOrder = NULL;
        newSession->maximumReceiveWindowSize =
                INITIAL_MAXIMUM_RECEIVE_WINDOW_SIZE;
        /* lastReceiveTime does not need to be initialized */
        newSession->numberOfMeteredPacketsReceived = 0;
        newSession->totalMeteredReceiveGapTime = 0;
        /* networkInfo gets filled in later */
        /* Round trip measurment */
        newSession->lastRoundTripUpdateTime = 0;
        newSession->numberOfRoundTripMeasurments = 0;
        newSession->totalRoundTripMeasurmentTime = 0;
        newSession->averageRoundTripTime = 0;
        newSession->longestRoundTripTime.value = 0;
        newSession->longestRoundTripTime.recentValue = 0;
        newSession->longestRoundTripTime.numberOfSamples = 0;
        newSession->longestRoundTripTime.samplesToKeep =
                NUMBER_OF_LONGEST_ROUND_TRIP_SAMPLES / 2;
        /* Transmit throughput measurment */
        /* transmitStartTime does not need to be initialized */
        newSession->bestSendWindowSize = MINIMUM_WINDOW_SIZE;
        newSession->bestThroughput.value = 0;
        newSession->bestThroughput.recentValue = 0;
        newSession->bestThroughput.numberOfSamples = 0;
        newSession->bestThroughput.samplesToKeep =
                NUMBER_OF_THROUGHPUT_SAMPLES / 2;
        newSession->transmitTimeElapsed = 0;
        newSession->messageBytesTransmittedSinceSample = 0;
        /* Send window adjustment statistics */
        newSession->maximumWindowSizeGrowAmount = 5;
        newSession->maximumWindowGrowthAboveBest = 12;
        newSession->targetMaximumWindowGrowthAboveBest = 3;
        newSession->sampleState = SAMPLES_AT_BEST;
        newSession->sampleCount = 0;
        newSession->sendWindowSize = MINIMUM_WINDOW_SIZE;
        newSession->lowestReceiveGap.value = 0xFFFFFFFF;
        newSession->lowestReceiveGap.recentValue = 0xFFFFFFFF;
        newSession->lowestReceiveGap.numberOfSamples = 0;
        newSession->lowestReceiveGap.samplesToKeep =
                NUMBER_OF_SMALLEST_RECEIVE_GAP_SAMPLES / 2;
        /* Ack controls */
        newSession->myWindowUpdateThreshold = newSession->sendWindowSize / 2;
        newSession->peerWindowUpdateThreshold = MINIMUM_WINDOW_SIZE / 2;
        newSession->delayedAckTimeInterval = 110 *
HIGH_RES_TO_MILLISECOND_RATIO;
        newSession->lastAckTime = 0;
        /* minimumDuplicateAckInterval gets filled in later */
        /* Nak controls */
        newSession->minimumDelayedNakTimeInterval = 30 *
                HIGH_RES_TO_MILLISECOND_RATIO;
        newSession->maximumDelayedNakTimeInterval = 55 *
                HIGH_RES_TO_MILLISECOND_RATIO;
        newSession->outOfOrderCount = 0;
        /* lastNakTime does not need to be initialized */
        /* minimumDuplicatePacketInterval gets filled in later */
        /* LIP controls */
        newSession->LIPLastTransmitTime = 0;
        newSession->LIPPacketSize = 0;
        newSession->LIPRetryCount = 0;
        /* Timeout retransmit controls */
        /* NOTE: retransmitTimeInterval get filled in later */
        newSession->maxRetransmitCount = DEFAULT_MAXIMUM_RETRIES;
        newSession->retransmitRetryCount = 0;
```

-continued

```
#if DebugVersion
    Zero newSession variables used for debug statistics, except:
    newSession->receiveGap = 0xFFFFFFFF;
    newSession->smallestSendWindowSize = MINIMUM_WINDOW_SIZE;
    newSession->largestSendWindowSize = MINIMUM_WINDOW_SIZE;
#endif
    ccode = newSession->networkCallBack->BeginSession(networkAddress,
            newSession,
            sizeof(struct GeneralHeader),
            &boardNumber,
            &transmitTime,
            &newSession->maximumEndpointPacketSize,
            &newSession->networkInfo);
    if (ccode != ACP_SUCCESS)
        goto Error1;
    ccode = GetBoard(boardNumber, &newSession->board);
    if (ccode != ACP_SUCCESS)
        goto Error2;
    /* Base initial time values on the estimated time to net */
    newSession->minimumDuplicateAckInterval = ((transmitTime * 4) +
            MINIMUM_DUPLICATE_DELAY) * HIGH_RES_TO_MILLISECOND_RATIO;
    newSession->retransmitTimeInterval = ((transmitTime * 8) +
            MINIMUM_RETRY_DELAY) * HIGH_RES_TO_MILLISECOND_RATIO;
    newSession->minimumDuplicatePacketInterval = ((transmitTime * 4) +
            MINIMUM_RETRY_DELAY) * HIGH_RES_TO_MILLISECOND_RATIO;
    newSession->maximumRouteablePacketSize = newSession->
            maximumEndpointPacketSize;
    /* Add the session into the index */
    for (index = 0; index < sizeOfSessionIndex; index++)
    {
        if ((*sessionIndex)[index] == NULL)
            break;
    }
    if (index >= sizeOfSessionIndex)
    {
        /* We need to grow the session index */
        ccode = GrowSessionIndex( );
        if (ccode != ACP_SUCCESS)
        {
            goto Error2; /* couldn't grow the index */
        }
    }
    newSession->mySessionNumber = index | ((*sessionUniqueID)[index] << 24);
    /* We don't know the remote session number yet */
    newSession->remoteSessionNumber = 0xFFFFFFFF;
    (*sessionIndex)[index] = newSession;
    numberOfActiveSessions++;
    /* The session is now fully functional */
    if (!createRequestedByPeer)
    {
        /* need to inform peer this session was created
            by sending a create session request.*/
        ccode = GetBufferAndSetupSequencedVerb(newSession, &sendBuffer,
                &request, sizeof(struct CreateSessionRequest));
        if (ccode != ACP_SUCCESS)
        {
            RemoveSession(newSession, ccode);
            return (ccode);
        }
        /* Fill out the create session request */
        request->verbNumber = CREATE_SESSION_REQUEST_VERB;
        request->requestNumber = newSession->nextSystemRequestNumber++;
        request->sessionNumber = newSession->mySessionNumber;
        request->versionNumber = ACP_VERSION_NUMBER;
        request->maximumPacketSize = newSession—
>maximumEndpointPacketSize;
        request->maximumReceiveWindowSize =
                newSession->maximumReceiveWindowSize;
        Save request number to validate correct reply received.
        ReleaseSystemMessageBuffer(newSession, sendBuffer,
                DELAY_SYSTEM_MESSAGE);
    }
    *session = newSession;
    return (ACP_SUCCESS);
Error2:;
    newSession->networkCallBack->EndSession(newSession->networkInfo);
Error1:;
    NiosFree(mh, newSession);
Error0:;
```

-continued

```
        return (ccode);
}
UINT32 CreateSessionReplyVerb(
        struct SessionStruct *session,
        struct ReceiveBuffer *buffer,
        UINT32 time)
{
    struct CreateSessionReply *reply;
    reply = (struct CreateSessionReply *)buffer->startOfData;
    buffer->startOfData += sizeof(struct CreateSessionReply);
    if (buffer->startOfData > buffer->endOfData)
        /* The packet is too short */
        return (ACP_RECEIVED_MALFORMED_PACKET);
    if (session->remoteSessionNumber != 0xFFFFFFFF)
    {
        /* We already know the remote session number */
        /* Something is wrong with this session */
        return (ACP_INTERNAL_ERROR);
    }
    Verify that the request number is correct.
    if (reply->ccode != ACP_SUCCESS)
    {
        return (reply->ccode); /* The peer returned an error */
    }
    /* Save the returned information */
    session->maximumSendWindowSize = reply->maximumReceiveWindowSize;
    session->remoteSessionNumber = reply->sessionNumber;
    if (reply->maximumPacketSize < session->maximumEndpointPacketSize)
    {
        session->maximumEndpointPacketSize = reply->maximumPacketSize;
        session->maximumRouteablePacketSize = reply->maximumPacketSize;
        session->networkCallBack->SetMaximumRouteablePacketSize(
                session->networkInfo, session—
>maximumRouteablePacketSize,
                sizeof(struct GeneralHeader));
    }
    Save the version information.
    return (ACP_SUCCESS);
}
void RemoveSession(
        struct SessionStruct *session,
        UINT32 reasonCode)
{
    UINT32 index;
    struct ConnectionStruct *connection;
    struct SendBuffer *sendBuffer;
    struct ReceiveBuffer *receiveBuffer;
    struct MessageBlock *message;
    struct SystemRequestStruct *waitForReply;
    if (session->status == STATUS_TERMINATING)
    {
        return; /* This session is already being removed */
    }
    session->status = STATUS_TERMINATING;
    /* Remove this session from the index */
    index = session->mySessionNumber & 0x00FFFFFF;
    (*sessionUniqueID)[index]++;
    (*sessionIndex)[index] = NULL;
    /*  Make sure that this session doesn't have some type of event
        pending which will start sending packets */
    if (session->flags & SESSION_IS_BEING_TIMED)
        StopTimingSession(session);
    if (session->flags & METER_DELAY_SCHEDULED)
        CancelSessionMeterDelay(session);
    if (session->nextSendLink != NULL)
        CancelSessionSend(session);
    while (session->systemMessageWaitForReply != NULL)
    {
        waitForReply = session->systemMessageWaitForReply;
        session->systemMessageWaitForReply = waitForReply->next;
        waitForReply->ccode = ACP_CONNECTION_TIMED_OUT;
        NiosThreadSignalId((UINT32)waitForReply);
    }
    /*  Run through all of the connections to find those that belong
        to this session. All of the connections are NOT linked on
        to the send list */
    for (index = 0; index < sizeOfConnIndex; index++)
    {
        connection = (*connIndex)[index];
```

-continued

```
            if (connection == NULL)
                continue;
            if (connection->session == session)
            {
                RemoveConnection(connection, FALSE, reasonCode);
            }
        }
    }
#if DebugVersion
    if (session->connectionsWaitingToSend != NULL)
        call Debug(DEB_ALWAYS);
#endif
    while (session->systemMessageSendHead != NULL)
    {
        sendBuffer = session->systemMessageSendHead;
        session->systemMessageSendHead = sendBuffer->next;
        sendBuffer->BufferReleaseRoutine(sendBuffer);
    }
    if (session->receiveSequence != session->receiveLastAcked)
    {
        /*  Go ahead and send the ack so the other side does not
            get stuck retransmitting his packet (it may be a
            disconnect reply) */
        SendAckPacket(session, NiosGetHighResIntervalMarker( ));
    }
    /* Remove all the packets from the retransmit list */
    while (session->unackedPacketsHead != NULL)
    {
        sendBuffer = session->unackedPacketsHead;
        session->unackedPacketsHead = sendBuffer->next;
        /* Release the message buffers */
        while (SendBuffer->messagesToRelease != NULL)
        {
            message = sendBuffer->messagesToRelease;
            sendBuffer->messagesToRelease = message->next;
            (*message->releaseCallBack)(message);
        }
#if DebugVersion
    if (sendBuffer->flags & TRANSMIT_IS_COMPLETE)
        Debug(DEB_ALWAYS) "RemoveSession is releasing an unacked "
                "transmit buffer\r\n");
    else
        Debug(DEB_ALWAYS) "RemoveSession is flagging an unacked "
                "transmit buffer for release by the transmit "
                "complete esr\r\n");
#endif
        ReleaseSendBuffer(sendBuffer);
    }
    /* Release any packets received out of order */
    while (session->buffersReceivedOutOfOrder != NULL)
    {
        receiveBuffer = session->buffersReceivedOutOfOrder;
        session->buffersReceivedOutOfOrder = receiveBuffer->link;
        ReleaseReceiveBuffer(receiveBuffer);
    }
    session->networkCallBack->EndSession(session->networkInfo);
    NiosFree(mh, session);
    numberOfActiveSessions--;
    /*
        Let any connections that were waiting for a peer disconnect
        response finish cleaning up.
    */
    NiosPoll( );
}
```

Maximum Send Window Size

During a window limiting step 40, a maximum send window size is determined by the receiving endnode 34. In one embodiment a constant value INITIAL_MAXIMUM_RECEIVE_WINDOW_SIZE equal to 64 is defined. In alternative embodiments the maximum send window size is calculated based on available resources and/or expected throughput characteristics of the network 10.

Each endnode 32, 34 exchanges this maximum window size information when a session is initially established. If the sending endnode 32 later determines that the optimum window size might be bigger than the current maximum send window size it can ask the receiver 34 to increase the maximum size using a packet characterized by an identifier REQUEST_NEW_MAX_WINDOW_SIZE_VERB. In one embodiment the receiver 34 always grants requests to increase the maximum size, replying in a NEW_MAX_WINDOW_SIZE_VERB packet. In alternative embodiments the receiver 34 grants requests to increase the maximum window size only after determining that there are sufficient resources available, such as buffer memory. The receiver 34 may select a new maximum receive window size that is smaller and then tell the sender 32 the new size using a NEW_MAX_WINDOW_SIZE_VERB packet.

In one embodiment, a new maximum window size is requested using routines and structures such as the following:

```
UINT32 RequestNewMaxWindowSizeVerb(
        struct SessionStruct *session,
        struct ReceiveBuffer *buffer,
        UINT32 time)
{
    UINT32 ccode;
    struct RequestNewMaxWindowSize *requestVerb;
    struct SendBuffer *sendBuffer;
    struct NewMaximumWindowSize *reply;
    requestVerb = (struct RequestNewMaxWindowSize *)buffer->startOfData;
    buffer->startOfData += sizeof(struct RequestNewMaxWindowSize);
    if (buffer->startOfData > buffer->endOfData)
        return (ACP_RECEIVED_MALFORMED_PACKET); /* packet is too short */
    if (requestVerb->requestedMaximumWindowSize <= session->
            maximumReceiveWindowSize)
        return(ACP_SUCCESS);
    Get a message buffer.
    reply->verbNumber = NEW_MAX_WINDOW_SIZE_VERB;
    reply->newMaximumWindowSize = requestVerb->requestedMaximumWindowSize;
    Do we have enough memory to grow the window size this much?
    /* Grow window size by at least 16 */
    if (reply->newMaximumWindowSize < (session->
            maximumReceiveWindowSize + 16))
        reply->newMaximumWindowSize = session->maximumReceiveWindowSize +
16;
    session->maximumReceiveWindowSize = reply->newMaximumWindowSize;
    ReleaseSystemMessageBuffer(session, sendBuffer, SEND_SYSTEM_MESSAGE);
    return (ACP_SUCCESS);
}
void ChangeSendWindowSize(
        struct SessionStruct *session,
        UINT32 newSendWindowSize)
{
    UINT32 newUpdateSize;
    if (newSendWindowSize > session->maximumSendWindowSize)
    {
        /* Ask the other side to increase our maximum send window size */
        RequestLargerMaximumSendWindow(session, newSendWindowSize);
        newSendWindowSize = session->maximumSendWindowSize;
    }
    else if (newSendWindowSize < MINIMUM_WINDOW_SIZE)
    {
        newSendWindowSize = MINIMUM_WINDOW_SIZE;
    }
    if (newSendWindowSize == session->sendWindowSize)
        /* The size is was not changed */
        return;
#if DebugVersion
    if (newSendWindowSize > session->sendWindowSize)
    {
        if (newSendWindowSize > session->largestSendWindowSize)
        {
            session->largestSendWindowSize = newSendWindowSize;
            UpdateNumber(LARGEST_SEND_WINDOW_SIZE, session);
        }
    }
    else if (newSendWindowSize < session->smallestSendWindowSize)
    {
        session->smallestSendWindowSize = newSendWindowSize;
        UpdateNumber(SMALLEST_SEND_WINDOW_SIZE, session);
    }
#endif
    session->sendWindowSize = newSendWindowSize;
    /* Set the window update interval to ¼ of the window size */
    newUpdateSize = session->sendWindowSize / 4;
    if (session->myWindowUpdateThreshold != newUpdateSize)
    {
        session->myWindowUpdateThreshold = newUpdateSize;
        NotifyPeerOfNewUpdateSize(session);
    }
    if ((session->flags & WINDOW_IS_CLOSED) &&
            ((session->sendSequence - session->sendLastAcked) <
            session->sendWindowSize))
    {
#if DebugVersion
```

-continued

```
        Debug(DEB_WINDOW_CLOSE) "WINDOW is now OPEN\r\n");
        UpdateMessage(WINDOW_CLOSE_OCCURING, session, FALSE);
        if (session->nextSendLink != NULL)
            NiosPrintf(mh, MT_ABEND, "ChangeSendWindowSize found the "
                    "window closed and the nextSendLink not
NULL\r\n");
#endif
        session->flags &= ~WINDOW_IS_CLOSED;
        ScheduleSessionToSend(session);
    }
}
void NotifyPeerOfNewUpdateSize(
        struct SessionStruct *session)
{
    UINT32 ccode;
    struct SendBuffer *sendBuffer;
    struct SetWindowUpdateThreshold *update;
    GetBufferAndSetupSequencedVerb(session, &sendBuffer, &update,
            sizeof(struct SetWindowUpdateThreshold));
    If unable to send the request, a problem may arise if the size just got
    smaller. Handle it and return.
    /* Fill out the ACP verb message */
    update->verbNumber = SET_WINDOW_UPDATE_THRESHOLD_VERB;
    update->windowUpdateThreshold = session->myWindowUpdateThreshold;
    ReleaseSystemMessageBuffer(session, sendBuffer, SEND_SYSTEM_MESSAGE);
}
void RequestLargerMaximumSendWindow(
        struct SessionStruct *session,
        UINT32 newMaximumWindowSize)
{
    UINT32 ccode;
    struct SendBuffer *sendBuffer;
    struct RequestNewMaxWindowSize *request;
    GetBufferAndSetupSequencedVerb(session, &sendBuffer, &request,
            sizeof(struct RequestNewMaxWindowSize));
    /* Fill out the ACP verb message */
    request->verbNumber = REQUEST_NEW_MAX_WINDOW_SIZE_VERB;
    request->requestedMaximumWindowSize = newMaximumWindowSize;
    ReleaseSystemMessageBuffer(session, sendBuffer, SEND_SYSTEM_MESSAGE);
}
UINT32 NewMaximumWindowSizeVerb(
        struct SessionStruct *session,
        struct ReceiveBuffer *buffer,
        UINT32 time)
{
    struct NewMaximumWindowSize *requestVerb;
    requestVerb = (struct NewMaximumWindowSize *)buffer->startOfData;
    buffer->startOfData += sizeof(struct NewMaximumWindowSize);
    if (buffer->startOfData > buffer->endOfData)
        /* The packet is too short */
        return (ACP_RECEIVED_MALFORMED_PACKET);
    session->maximumSendWindowSize = requestVerb->newMaximumWindowSize;
    if (session->sendWindowSize > session->maximumSendWindowSize)
        ChangeSendWindowSize(session, session->maximumSendWindowSize);
    return (ACP_SUCCESS);
}
```

Thus, during a window initializing step 42 a current send window size is determined by the sending endnode 32. The current send window size will not exceed the maximum send window size. In one embodiment two is used as an initial value for the current send window size, but other values are also suitable. As data is sent, the sending endnode 32 searches for the best send size by trying different sizes and by building and referring to a history of the total data throughput at each size in order to select a best size.

The sending endnode 32 also responds to lost packets and congestion by decreasing the send window size. In one embodiment, session variables are initially set as follows:

```
maximumWindowSizeGrowAmount = 5;
maximumWindowGrowthAboveBest = 12;
targetMaximumWindowGrowthAboveBest = 3;
sampleState = SAMPLES_AT_BEST;
sampleCount = 0;
sendWindowSize = MINIMUM_WINDOW_SIZE (2);
bestSendWindowSize = MINIMUM_WINDOW_SIZE (2);
```

If an ACK is received indicating that the receiver 34 is experiencing congestion, the sender 32 attempts to decrease the send window size by two and readjusts the best window. Otherwise, if the sender's send window has closed since the previous ack was received, the sender 32 attempts to increase the send window size by the number of packets acknowledged by the ACK which it just received.

When the sender 32 receives notices that a packet was lost, and retransmits the packet, it attempts to decrease the send window size by one and readjust the best window size. When the sender 32 receives a NEW_MAX_WINDOW_SIZE_VERB from the receiver 34, it checks to see if the current send window size is larger than the new maximum. If it is then the sender 32 changes the current send window size to the new maximum send window size.

During initial connection startup, possible send window sizes are probed during iterations of the window initializing step 42. The current window size is allowed to grow several packets larger than the current best window size until network throughput no longer increases. The current window size is then reset to the window size which provided the maximum throughput; that window size accordingly becomes the current best window size. The throughput is preferably monitored for a lack of increase rather than a decrease because a larger than optimum window size may temporarily allow the same throughput as the optimum size if the intermediate nodes 36 have enough buffer space to postpone packet losses.

During normal operation after the startup phase, probing is repeated to determine whether the best send window size has changed. In one embodiment, probing is part of an ack processing step 56. In another embodiment, probing is initiated each time the send window closes during a packet placing step 48. Other embodiments initiate probing based on the number of packets sent during the placing step 48 or the expiration of a time-out period between any of the sending endnode steps shown in FIG. 2.

The current send window size is decreased if an adjusting step 62 determines that packets have been dropped. The adjusting step may be performed periodically in response to a timer expiration, or it may be performed as part of other steps such as the packet placing step 48, ack processing step 56, and/or gap change processing step 60. The current send window size is also decreased during the adjusting step 62 if the receiving endnode 34 sends a congestion notice to the sending endnode 32.

In one embodiment, the current send window size is reset during the adjusting step 62 to the previous best window size. In another embodiment, the current send window is decreased by a factor, such as one-half. In either case, however, probing continues after the decrease to adapt the best send window size to changes in the network 10.

Thus, the send window size is not statically configured under the present invention. Unlike the static or manually configured maximum send window size used in TCP, the best window size of the present method is determined dynamically by probing different window sizes and examining the resulting throughput measurements to determine which window size is best. Regular probing takes place even when packets are not dropped, so the present method, unlike the slow start method of TCP, can also detect and take advantage of increases in bandwidth. Moreover, when data is given to the sending endnode 32 intermittently, the present method does not waste bandwidth by resetting the send window size to one, as TCP layers do. Instead, the last known best send window size is used.

In one embodiment, the send window size is managed using routines and structures such as the following:

```
void DecreaseSendWindowSize(
        struct SessionStruct *session,
        UINT32 decreaseAmount)
{
    /* Decrease the window size */
    ChangeSendWindowSize(session, session—>sendWindowSize - decreaseAmount);
    /* Reset the best send window size */
    session—>bestSendWindowSize = session—>sendWindowSize;
    /* Slow down how fast the size can be pushed up by window closes */
    if (session—>sampleState == SAMPLES_AT_BEST)
    {
        session—>sampleCount = 0;
    }
    if (session—>maximumWindowSizeGrowAmount > 0)
        session—>maximumWindowSizeGrowAmount -= 1;
    if (session—>maximumWindowGrowthAboveBest > 0)
        session—>maximumWindowGrowthAboveBest -= 1;
    if (session—>targetMaximumWindowGrowthAboveBest > 0)
        session—>targetMaximumWindowGrowthAboveBest -= 1;
}
void IncreaseSendWindowSize(
        struct SessionStruct *session,
        UINT32 increaseAmount)
{
    UINT32 maxWindowSize, newWindowSize;
    maxWindowSize = session—>bestSendWindowSize +
            session—>maximumWindowGrowthAboveBest;
    if (increaseAmount >
            session—>maximumWindowSizeGrowAmount)
        newWindowSize = session—>sendWindowSize +
                session—>maximumWindowSizeGrowAmount;
    else
        newWindowSize = session—>sendWindowSize +
                increaseAmount;
    if (newWindowSize > maxWindowSize)
        newWindowSize = maxWindowSize;
    ChangeSendWindowSize(session, newWindowSize);
}
```

Throughput History

The sender 32 samples the current send throughput at regular intervals. These intervals are based on the time spent transmitting data; idle time when no data is being transmitted is not included. When the time spent transmitting data exceeds ((the average round trip time*2)+1 second) then a throughput sample is taken. For each sample, an embodiment checks to see if the current window size is the same as the previously calculated best window size. If the current send window size is the same as the previously calculated best window size, then the throughput history at the best window size is updated using the new sample.

History maintenance software ages old throughput samples and removes them. In one embodiment, only the best throughput of the four (for instance) most recent throughput samples is tracked in the history.

If the current send window size is different than the previously calculated best window size, the embodiment checks to see if the new throughput sample is higher than the previously calculated best window size's throughput as recorded in the best throughput history. If it is then a new best send window size has been found. The embodiment marks the current send window size as the calculated best send window size, and updates the throughput of the best window size using the new throughput sample.

If the current send window size is less than the best size, the embodiment attempts to grow the current send window size by one. In addition, if the current send window size has been less than the best send window size for the last ten (for instance) throughput samples then the embodiment resets the best send window size to be the current send window size.

One embodiment manages the history using routines and structures such as the following:

```
void UpdateTransmitThroughputHistory(
            struct SessionStruct *session)
{
      UINT32 transmitRate;
      /* Calculate the transmit throughput */
      transmitRate = TransferRatePerSecond(
                  session—>messageBytesTransmittedSinceSample,
                  session—>transmitTimeElapsed /
      HIGH_RES_TO_MILLISECOND_RATIO);
      /* Reset the variables to calculate throughput */
      session—>messageBytesTransmittedSinceSample = 0;
      session—>transmitTimeElapsed = 0;
      if (transmitRate == 0)
      {
            /* No data is being transmitted, don't record this sample */
            return;
      }
      if (session—>bestSendWindowSize == session—>sendWindowSize)
            UpdateLargestHistoryValue(&session—>bestThroughput, transmitRate);
      else if (transmitRate > session—>bestThroughput.value)
      {
            session—>bestSendWindowSize = session—>sendWindowSize;
            UpdateLargestHistoryValue(&session—>bestThroughput, transmitRate);
      }
//**  if ((session—>flags & (ACK_WAS_RECEIVED | WINDOW_ALMOST_CLOSED)) ==
//**        ACK_WAS_RECEIVED)
//**  {
//**        /* Window is so large that it is not getting close to closing */
//**        ChangeSendWindowSize(session, session—>sendWindowSize - 1);
//**  }
      if (session—>sendWindowSize != session—>bestSendWindowSize)
      {
            /*  The current size is not the best size, change
                the window size back to the best size      */
            /* We are not at the best sample in the history */
            if (session—>sendWindowSize < session—>bestSendWindowSize)
            {
                  ChangeSendWindowSize(session, session—>sendWindowSize + 1);
                  if (session—>sampleState == SAMPLES_BELOW_BEST)
                  {
                        if (session—>sampleCount >= 10)
                        {
                              /* Reset the best send window size */
                              session—>bestSendWindowSize = session—>sendWindowSize;
                              session—>sampleCount = 0;
                        }
                        else
                              session—>sampleCount++;
                  }
                  else
                  {
                        session—>sampleState = SAMPLES_BELOW_BEST;
                        session—>sampleCount = 0;
                  }
```

-continued

```
            }
            else
            {
                if (session—>sampleState == SAMPLES_ABOVE_BEST)
                {
                    if (session—>sampleCount >=
NUMBER_OF_THROUGHPUT_SAMPLES)
                    {
                        DecreaseSendWindowSize(session, 1);
                        session—>sampleCount = 0;
                    }
                    else
                    {
                        ChangeSendWindowSize(session, session—
>sendWindowSize - 1);
                        session—>sampleCount++;
                    }
                }
                else
                {
                    session—>sampleState = SAMPLES_ABOVE_BEST;
                    session—>sampleCount = 1;
                }
            }
        }
        else
        {
            /* Our last sample is the best */
            if (session—>sampleState == SAMPLES_AT_BEST)
            {
                session—>sampleCount++;
                if (session—>sampleCount >= NUMBER_OF_THROUGHPUT_SAMPLES)
                {
                    if (session—>maximumWindowGrowthAboveBest !=
                              session—
>targetMaximumWindowGrowthAboveBest)
                        session—>maximumWindowGrowthAboveBest =
                                  session—
>targetMaximumWindowGrowthAboveBest;
                    if (session—>maximumWindowSizeGrowAmount != 1)
                        session—>maximumWindowSizeGrowAmount = 1;
                    if (session—>targetMaximumWindowGrowthAboveBest < 3)
                        session—>targetMaximumWindowGrowthAboveBest +=
1;
                    session—>sampleCount = 0;
                }
            }
            else
            {
                session—>sampleState = SAMPLES_AT_BEST;
                session—>sampleCount = 1;
            }
        }
//**     session—>flags &= ~(ACK_WAS_RECEIVED | WINDOW_ALMOST_CLOSED);
}
UINT32 UpdateLargestHistoryValue(
            struct HistoryStruct *history,
            UINT32 newValue)
{
    UINT32 previousValue;
    if (history—>numberOfSamples >= history—>samplesToKeep)
    {
        history—>numberOfSamples = 0;
        previousValue = history—>value;
        if (newValue > history—>recentValue)
        {
            history—>value = newValue;
            history—>recentValue = newValue;
        }
        else
        {
            history—>value = history—>recentValue;
            history—>recentValue = newValue;
        }
        if (previousValue == history—>value)
            return (FALSE);
        else
            return (TRUE);
    }
```

-continued

```
        else
        {
            history—>numberOfSamples++;
            if (newValue > history—>recentValue)
            {
                history—>recentValue = newValue;
                if (newValue > history—>value)
                {
                    history—>value = newValue;
                    return (TRUE);
                }
            }
            return (FALSE);
        }
}
UINT32 UpdateLowestHistoryValue(
            struct HistoryStruct *history,
            UINT32 newValue)
{
    UINT32 previousValue;
    if (history—>numberOfSamples >= history—>samplesToKeep)
    {
        history—>numberOfSamples = 0;
        previousValue = history—>value;
        if (newValue < history—>recentValue)
        {
            history—>value = newValue;
            history—>recentValue = newValue;
        }
        else
        {
            history—>value = history—>recentValue;
            history—>recentValue = newValue;
        }
        if (previousValue == history—>value)
            return (FALSE);
        else
            return (TRUE);
    }
    else
    {
        history—>numberOfSamples++;
        if (newValue < history—>recentValue)
        {
            history—>recentValue = newValue;
            if (newValue < history—>value)
            {
                history—>value = newValue;
                return (TRUE);
            }
        }
        return (FALSE);
    }
}
void UpdateRoundTripTime(
            struct SessionStruct *session,
            UINT32 time,
            UINT32 roundTripTime,
            UINT32 timeDelayed)
{
    if (roundTripTime < timeDelayed)
    {
#if DebugVersion
        Debug(DEB_ALWAYS) "Ack time delayed of %u is larger than "
                "the total round trip of %u\r\n",
                timeDelayed, roundTripTime);
#endif
        roundTripTime = 0;
    }
    else
        roundTripTime -= timeDelayed;
    session—>numberOfRoundTripMeasurments++;
    session—>totalRoundTripMeasurmentTime += roundTripTime;
    /* Update the longest round trip time */
    if (UpdateLargestHistoryValue(&session—>longestRoundTripTime,
            roundTripTime))
    {
        UpdateLongestRoundTripTimeouts(session);
    }
```

```
        if ((session—>totalRoundTripMeasurmentTime >
                MINIMUM_SAMPLE_TIME) && ((time -
                session—>lastRoundTripUpdateTime) >
                MINIMUM_SAMPLE_TIME))
        {
            /* It is time to update the round trip samples */
            session—>lastRoundTripUpdateTime = time;
            session—>averageRoundTripTime = session—>
                    totalRoundTripMeasurmentTime /
                    session—>numberOfRoundTripMeasurments;
            session—>numberOfRoundTripMeasurments = 0;
            session—>totalRoundTripMeasurmentTime = 0;
            /* Update the control variable time intervals */
            session—>delayedAckTimeInterval = (session—>averageRoundTripTime /
                    2) + (100 * HIGH_RES_TO_MILLISECOND_RATIO);
            session—>minimumDelayedNakTimeInterval =
                    (session—>averageRoundTripTime / 8) +
                    (30 * HIGH_RES_TO_MILLISECOND_RATIO);
            session—>maximumDelayedNakTimeInterval =
                    (session—>averageRoundTripTime / 4) +
                    (50 * HIGH_RES_TO_MILLISECOND_RATIO);
            session—>minimumDuplicatePacketInterval =
                    session—>averageRoundTripTime;
        }
}
void UpdateLongestRoundTripTimeouts(
        struct SessionStruct *session)
{
        /* Update the control variable time intervals */
        session—>retransmitTimeInterval = session—>longestRoundTripTime.value +
                (MINIMUM_RETRY_DELAY * HIGH_RES_TO_MILLISECOND_RATIO);
        session—>minimumDuplicateAckInterval =
                session—>longestRoundTripTime.value;
}
```

Interpacket Gap Initialization

During a gap initializing step 44, a current interpacket gap interval is determined by the sending endnode. Zero is used as an initial value in one embodiment, but other interpacket gap intervals are also suitable.

When data is ready to be sent, the sending endnode 32 performs packet marking and placing steps 46 and 48 as follows. After assembling a packet for transmission, sending endnode 32 will pause for the required interpacket gap interval before assembling the next packet. Sending endnode 32 does not check to see if there is any additional data to transmit before pausing. Instead, it pauses and then checks to see if there is additional data to transmit. If there is additional data then sending endnode 32 assembles another packet (which it marks as metered) and then pauses again. It is possible for new data to arrive after sending endnode 32 finished assembling a packet with all the data previously available, but before the end of the pause. In this case the packet assembled with the new data will be marked. If after a pause, there is not more data to transmit then the session in question will go inactive. The next packet that is sent when the session becomes active again will not be marked as metered. After it is sent, sending endnode 32 will pause again and then repeat the cycle described above.

The marking step 46 may be omitted for the first packet. During the packet marking step 46 the second packet is marked to indicate that it follows the first packet at a delay equal to the current interpacket gap interval, which is initially zero time increments. Because two packets are now outstanding and the current send window size is two, the window then closes.

In one embodiment, the marking step 46 and the sending step 48 are performed using routines and structures such as the following:

```
void ScheduleSessionMeterDelay(
        struct SessionStruct *session)
{
    struct SessionStruct **sessionLink;
    sessionLink = &delayedSessionsHead;
    while ((*sessionLink != NULL) && ((*sessionLink)—>packetGapStartTime <
            session—>packetGapStartTime))
    {
        sessionLink = &(*sessionLink)—>meterDelayLink;
    }
    session—>meterDelayLink = *sessionLink;
    *sessionLink = session;
    session—>flags |= METER_DELAY_SCHEDULED;
    /* Schedule the AES routine */
    if (!timedSessionEsrScheduled)
    {
```

-continued

```
            NiosScheduleAESEvent(mh, 1, &timedSessionEcb);
            timedSessionEsrScheduled = TRUE;
            timedSessionEsrIdleCount = 0;
        }
}
void CancelSessionMeterDelay(
        struct SessionStruct *session)
{
    struct SessionStruct **sessionLink;
    for (sessionLink = &delayedSessionsHead; *sessionLink != NULL;
            sessionLink = &(*sessionLink)—>meterDelayLink)
    {
        if (*sessionLink == session)
        {
            *sessionLink = session—>meterDelayLink;
            session—>flags &= ~METER_DELAY_SCHEDULED;
            return;
        }
    }
    /* The session was not on the meter delay list */
    session—>flags &= ~METER_DELAY_SCHEDULED;
    return;
}
UINT32 SetSendPacketGapVerb(
        struct SessionStruct *session,
        struct ReceiveBuffer *buffer,
        UINT32 time)
{
    struct SetSendPacketGap *gapVerb;
    gapVerb = (struct SetSendPacketGap *)buffer—>startOfData;
    buffer—>startOfData += sizeof(struct SetSendPacketGap);
    if (buffer—>startOfData > buffer—>endOfData)
        /* The packet is too short */
        return (ACP_RECEIVED_MALFORMED_PACKET);
    /*  Always keep the send gap a little smaller than the receive gap
        so that the receiver will detect if the gap value can be
        decreased further. */
    if (gapVerb—>newSendPacketGap <= (1 * HIGH_RES_TO_MILLISECOND_RATIO))
        session—>sendGap = 0;
    else
        session—>sendGap = gapVerb—>newSendPacketGap -
                (1 * HIGH_RES_TO_MILLISECOND_RATIO);
    return (ACP_SUCCESS);
}
void NotifyPeerOfNewSendGap(
        struct SessionStruct *session,
        UINT32 newReceiveGap)
{
    UINT32 ccode;
    struct SendBuffer *sendBuffer;
    struct SetSendPacketGap *gapVerb;
    ccode = GetBufferAndSetupSequencedVerb(session, &sendBuffer, &gapVerb,
            sizeof(struct SetSendPacketGap));
    if (ccode != ACP_SUCCESS)
    {
        return; /* Can't send the request */
    }
    /* Fill out the ACP verb message */
    gapVerb—>verbNumber = SET_SEND_PACKET_GAP_VERB;
    gapVerb—>newSendPacketGap = newReceiveGap;
    ReleaseSystemMessageBuffer(session, sendBuffer, SEND_SYSTEM_MESSAGE);
}
void SendSessionData(
        struct SessionStruct *session,
        UINT32 time,
        UINT32 *sessionFinishedSendingFlag)
{
    struct SendBuffer *sendBuffer;
    struct ConnectionStruct *connection;
    UINT32 ccode, beginningBufferSize, timeSinceLastNak;
    UINT32 packetIsMetered, connectionFinishedSendingFlag;
#if DebugVersion
    if (session—>flags & METER_DELAY_SCHEDULED)
    {
        NiosPrintf(mh, MT_ABEND, "SendSessionData found "
                "meter delay was scheduled\r\n");
    }
#endif
    /* Check to see if we need to insert a interpacket gap before sending */
```

-continued

```
        if (session—>flags & METER_START_TIME_SET)
        {
            /* See if the current time has reached the start time */
            if ((time - session—>packetGapStartTime) & 0x80000000)
            {
                /*  We need to wait the appropriate meter interval
                    before sending the next packet      */
#if DebugVersion
                session—>numberOfGapsInserted++;
                Debug(DEB_AES) "Scheduling AES packet gap "
                        "metering delay (session %u) at time "
                        "%u of %u\r\n",
                        session—>mySessionNumber,
                        time, session—>packetGapStartTime - time);
#endif
                ScheduleSessionMeterDelay(session);
                *sessionFinishedSendingFlag = TRUE;
                return;
            }
            packetIsMetered = TRUE;
        }
        else
        {
            session—>packetGapStartTime = time - TIMER_HIGH_RES_GRANULARITY;
            session—>flags |= METER_START_TIME_SET;
            packetIsMetered = FALSE;
        }
        /* Check to see if there is any data to send */
        if ((session—>systemMessageSendHead == NULL) &&
                (session—>connectionsWaitingToSend == NULL))
        {
            /* There is not any data waiting to be sent on this session */
            session—>flags &= ~METER_START_TIME_SET;
            *sessionFinishedSendingFlag = TRUE;
            return;
        }
        /* We shouldn't get here if the window is closed */
        /* Check to see if the send window is closed */
        if ((session—>sendSequence - session—>sendLastAcked) >=
                session—>sendWindowSize)
        {
            /* The window just closed */
            session—>flags &= ~METER_START_TIME_SET;
            session—>flags |= (WINDOW_IS_CLOSED | WINDOW_CLOSED_SINCE_ACK);
            *sessionFinishedSendingFlag = TRUE;
            return;
        }
        if (session—>systemMessageSendHead != NULL)
        {
            sendBuffer = session—>systemMessageSendHead;
            session—>systemMessageSendHead = sendBuffer—>next;
        }
        else
        {
            /* Build the next physical packet */
            ccode = GetNewSendBuffer(session, &sendBuffer);
            if (ccode != ACP_SUCCESS)
            {
                /* network support module did not have any send buffers */
                Schedule an event to reschedule this board later.
                return;
            }
        }
        sendBuffer—>generalHeader—>sequenceNumber = ++(session—>sendSequence);
        if (packetIsMetered)
            sendBuffer—>generalHeader—>flags |= PACKET_IS_METERED;
        if (session—>receiveSequence != session—>receiveLastAcked)
        {
            /* Piggyback the ack with this packet */
            BuildAckVerb(session, sendBuffer, time);
        }
        if (session—>outOfOrderCount != 0)
        {
            timeSinceLastNak = time - session—>lastNakTime;
            if (((session—>flags & NEW_NAK_PENDING) &&
                    ((timeSinceLastNak) >
                    session—>minimumDelayedNakTimeInterval)) ||
                    ((timeSinceLastNak) > session—
>retransmitTimeInterval))
```

-continued

```
            /* Piggyback the nak with this packet */
            BuildNakVerbs(session, sendBuffer, time);
    }
    if (session—>connectionsWaitingToSend != NULL)
    {
        beginningBufferSize = sendBuffer—>remainingBufferLength;
        while (sendBuffer—>remainingBufferLength >=
                (sizeof(struct PartialMessage) +
                MINIMUM_LOOKAHEAD_DATA_SIZE))
        {
            connection = session—>connectionsWaitingToSend—>
                    nextSendLink;
            connectionFinishedSendingFlag = FALSE;
            SendConnectionData(connection, sendBuffer,
            &connectionFinishedSendingFlag);
            if (connectionFinishedSendingFlag)
            {
                /* Remove this connection from session send list */
                if (connection—>nextSendLink == connection)
                {
                    /* There are no other connections with data */
                    session—>connectionsWaitingToSend = NULL;
                    connection—>nextSendLink = NULL;
                    break;
                }
                else
                {
                    session—>connectionsWaitingToSend—>nextSendLink
 =
                            connection—>nextSendLink;
                    connection—>nextSendLink = NULL;
                }
            }
            else
            {
                /* Advance to the next connection */
                session—>connectionsWaitingToSend = connection;
                break;
            }
        }
        session—>messageBytesTransmittedSinceSample += beginningBufferSize
-
                sendBuffer—>remainingBufferLength;
    }
    /* Send the packet */
    SendSequencedPacket(session, sendBuffer, time);
}
void ScheduleSessionToSend(
        struct SessionStruct *session)
{
    struct BoardStruct *board;
    if (session—>flags & (WINDOW_IS_CLOSED | METER_DELAY_SCHEDULED))
        /* The session is already scheduled */
        return;
    board = session—>board;
    if (board—>sessionsWaitingToSend == NULL)
    {
        session—>nextSendLink = session;
        board—>sessionsWaitingToSend = session;
        ScheduleBoardToSend(board);
    }
    else
    {
        session—>nextSendLink = board—>sessionsWaitingToSend—
>nextSendLink;
        board—>sessionsWaitingToSend—>nextSendLink = session;
        board—>sessionsWaitingToSend = session;
    }
    /* Keep track of the transmit throughput */
    if (session—>unackedPacketsHead == NULL)
    {
        /* We need to start tracking elapsed transmit time */
        session—>transmitStartTime = NiosGetHighResIntervalMarker();
    }
}
void SendSequencedPacket(
        struct SessionStruct *session,
        struct SendBuffer *sendBuffer,
        UINT32 time)
```

-continued

```
{
    sendBuffer—>firstTransmitTime = time;
    sendBuffer—>lastTransmitTime = time;
    /* Link this packet onto the unacked packets list */
    if (session—>unackedPacketsHead == NULL)
    {
        session—>unackedPacketsHead = sendBuffer;
        sendBuffer—>prev = NULL;
    }
    else
    {
#if DebugVersion
        if (session—>unackedPacketsHead—>prev != NULL)
            NiosPrintf(mh, MT_ABEND, "SendSequencedPacket found "
                    "unackedPacketsHead prev was not NULL\r\n");
        if (session—>unackedPacketsTail == NULL)
            NiosPrintf(mh, MT_ABEND, "SendSequencedPacket found "
                }
        }
        session—>messageBytesTransmittedSinceSample += beginningBufferSize
—
                sendBuffer—>remainingBufferLength;
    }
    /* Send the packet */
    SendSequencedPacket(session, sendBuffer, time);
}
void ScheduleSessionToSend(
        struct SessionStruct *session)
{
    struct BoardStruct *board;
    if (session—>flags & (WINDOW_IS_CLOSED | METER_DELAY_SCHEDULED))
        /* The session is already scheduled */
        return;
    board = session—>board;
    if (board—>sessionsWaitingToSend == NULL)
    {
        session—>nextSendLink = session;
        board—>sessionsWaitingToSend = session;
        ScheduleBoardToSend(board);
    }
    else
    {
        session—>nextSendLink = board—>sessionsWaitingToSend—
>nextSendLink;
        board—>sessionsWaitingToSend—>nextSendLink = session;
        board—>sessionsWaitingToSend = session;
    }
    /* Keep track of the transmit throughput */
    if (session—>unackedPacketsHead == NULL)
    {
        /* We need to start tracking elapsed transmit time */
        session—>transmitStartTime = NiosGetHighResIntervalMarker();
    }
}
void SendSequencedPacket(
        struct SessionStruct *session,
        struct SendBuffer *sendBuffer,
        UINT32 time)
{
    sendBuffer—>firstTransmitTime = time;
    sendBuffer—>lastTransmitTime = time;
    /* Link this packet onto the unacked packets list */
    if (session—>unackedPacketsHead == NULL)
    {
        session—>unackedPacketsHead = sendBuffer;
        sendBuffer—>prev = NULL;
    }
    else
    {
#if DebugVersion
        if (session—>unackedPacketsHead—>prev != NULL)
            NiosPrintf(mh, MT_ABEND, "SendSequencedPacket found "
                    "unackedPacketsHead prev was not NULL\r\n");
        if (session—>unackedPacketsTail == NULL)
            NiosPrintf(mh, MT_ABEND, "SendSequencedPacket found "
                    "unackedPacketsHead was not NULL but "
                    "unackedPacketsTail was NULL\r\n");
        if (session—>unackedPacketsTail—>next != NULL)
            NiosPrintf(mh, MT_ABEND, "SendSequencedPacket found "
```

-continued

```
            "unackedPacketTail next was not NULL\r\n");
        if ((session—>unackedPacketsHead—>next == NULL) &&
            (session—>unackedPacketsTail != session—
>unackedPacketsHead))
            NiosPrintf(mh, MT_ABEND, "SendSequencedPacket found "
                "unackedPacketsHead next was NULL but "
                "unackedPacketsTail was not the same as the
head\r\n");
        if ((session—>unackedPacketsTail—>prev == NULL) &&
            (session—>unackedPacketsTail != session—
>unackedPacketsHead))
            NiosPrintf(mh, MT_ABEND, "SendSequencedPacket found "
                "unackedPacketsTail prev was NULL but "
                "unackedPacketsTail was not the same as the
head\r\n");
#endif
        session—>unackedPacketsTail—>next = sendBuffer;
        sendBuffer—>prev = session—>unackedPacketsTail;
    }
    session—>unackedPacketsTail = sendBuffer;
    sendBuffer—>next = NULL;
    if (!(session—>flags & SESSION_IS_BEING_TIMED))
        StartTimingSession(session);
    /* Could move this assignment to one time only send buffer initialize */
    sendBuffer—>TransmitCompleteEsr = TransmitCompleteEsr;
    session—>packetGapStartTime += session—>sendGap;
    InterruptSafeIncrement(&session—>board—>transmitsNotCompleted);
    session—>networkCallBack—>SendDatagram(session—>networkInfo,
sendBuffer);
}
void ResendSequencedPacket(
        struct SessionStruct *session,
        struct SendBuffer *sendBuffer,
        UINT32 time)
{
    if ((session—>transmitStartTime - sendBuffer—>lastTransmitTime) &
            0x80000000)
    {
        /* Update the transmit elapsed time */
        session—>transmitTimeElapsed += sendBuffer—>lastTransmitTime -
                session—>transmitStartTime;
        session—>transmitStartTime = sendBuffer—>lastTransmitTime;
        if (session—>transmitTimeElapsed >
                ((session—>averageRoundTripTime * 2) +
                TRANSMIT_SAMPLE_TIME))
            UpdateTransmitThroughputHistory(session);
    }
    sendBuffer—>lastTransmitTime = time;
    sendBuffer—>generalHeader—>flags &= ~PACKET_IS_METERED;
    sendBuffer—>generalHeader—>flags |= PACKET_WAS_RETRANSMITTED;
    sendBuffer—>flags &= ~TRANSMIT_IS_COMPLETE;
    session—>packetGapStartTime += session—>sendGap;
    InterruptSafeIncrement(&session—>board—>transmitsNotCompleted);
    session—>networkCallBack—>ResendDatagram(sendBuffer);
}
```

Packet Transmission

During the placing step 48, the sending endnode 32 places the data packet on the network 10 for transmission to the receiving endnode 34. Transmission is accomplished by using network and lower layer protocols such as IP, IPX, IP/NG, IPX II, or ATM. The preferred embodiment has a network independent layer that allows it to operate over additional network layers by installing a new network support module. This allows the embodiment to support new network layer protocols that may emerge in the coming years.

Data to be transmitted may be submitted using various combinations of RAM buffers, bit flags, and/or interrupts. In one embodiment, the data is given to the transport layer in a message block. The message block allows the data to be broken into a number of fragments at different memory locations. Each fragment specifies the location and length of the data. This technique has been previously used when handing data to a network layer, but some previous transport interfaces require that the sender place all the data to be transmitted into one contiguous buffer before handing it to the transport, which imposes extra overhead copying the data.

Packet Receipt

During a removing step 50, the receiving endnode 34 removes transmitted packets from the network 10 using conventional means such as various combinations of RAM buffers, bit flags, and/or interrupts.

In one embodiment, the removing step 50 uses routines and structures such as the following:

```
void ProcessReceivedPacket(
        struct ReceiveBuffer *buffer)
{
    struct GeneralHeader *generalHeader;
    struct SessionStruct *session;
    UINT32 numberOfVerbs, verbNumber;
    UINT32 ccode, time, newReceiveGap;
    time = NiosGetHighResIntervalMarker();
    generalHeader = (struct GeneralHeader *)buffer—>startOfData;
    buffer—>startOfData += sizeof(struct GeneralHeader);
    if (buffer—>startOfData > buffer—>endOfData)
    {
        /* The packet is too short, discard it */
        ReleaseReceiveBuffer(buffer);
        return;
    }
#if DebugVersion
    Debug(DEB_PACKET_RECEIVES) "PROCESSING #%u: verbs=%u(%u-%u)\r\n",
            generalHeader—>sequenceNumber,
            generalHeader—>numberOfVerbs,
            generalHeader—>flags & CONTAINS_SYSTEM_VERBS ? 1 : 0,
            generalHeader—>flags & CONTAINS_SEQUENCED_VERBS ? 1 : 0);
#endif
    if (generalHeader—>sessionNumber == 0xFFFFFFFF)
        session = StartNewSession(generalHeader, buffer);
    else
    {
        session = LookUpSession(generalHeader—>sessionNumber);
#if DebugVersion
        if (session != NULL)
        {
            /* Verify that address from this packet matches session */
            if (buffer—>receiveBufferCallBack—>CheckPacketSourceAddress(
                    buffer, session—>networkInfo) != ACP_SUCCESS)
            {
                /* The source address does not match our session */
                NiosPrintf(mh, MT_ABEND, "!!!!!ProcessReceivedPacket found "
                        "source address does not match session address\r\n");
            }
        }
#endif
    }
    if (session == NULL)
    {
        /* Could not find or create the session */
        ReleaseReceiveBuffer(buffer);
        return;
    }
    /* Reset the retry count for this session, and check interpacket gap */
    session—>retransmitRetryCount = 0;
    if (generalHeader—>flags & PACKET_IS_METERED)
    {
        /*  This packet was seperated from the previous packet by
            the send meter interval */
        newReceiveGap = buffer—>receiveTime - session—>lastReceiveTime;
        session—>numberOfMeteredPacketsReceived++;
        session—>totalMeteredReceiveGapTime += newReceiveGap;
        if ((session—>totalMeteredReceiveGapTime > MINIMUM_SAMPLE_TIME) &&
                (session—>numberOfMeteredPacketsReceived >
                MINIMUM_PACKETS_IN_RECEIVE_GAP_SAMPLE))
        {
            newReceiveGap = session—>totalMeteredReceiveGapTime /
                    session—>numberOfMeteredPacketsReceived;
#if DebugVersion
            Debug(DEB_PACKET_GAP) "Calculated new receive gap %u, "
                    "last was %u (%u samples)\r\n",
                    newReceiveGap, session—>receiveGap,
                    session—>numberOfMeteredPacketsReceived);
#endif
            session—>numberOfMeteredPacketsReceived = 0;
            session—>totalMeteredReceiveGapTime = 0;
            if (UpdateLowestHistoryValue(&session—>lowestReceiveGap,
                    newReceiveGap))
            {
                NotifyPeerOfNewSendGap(session,
                        session—>lowestReceiveGap.value);
            }
```

-continued

```
        }
    }
    if (generalHeader—>flags & CONTAINS_SEQUENCED_VERBS)
    {
        session—>lastReceiveTime = buffer—>receiveTime;
        if (generalHeader—>sequenceNumber != (session—>receiveSequence +
1))
        {
            /* The sequence number is wrong */
            HandleIncorrectSequenceNumberPacket(session, buffer,
                    generalHeader, time);
            return;
        }
        if (packetsOnReceiveQueue > receiveCongestionThreshold)
            session—>flags |= RECEIVE_CONGESTION_OCCURING;
    }
ProcessOutOfOrderPacket:;
    /* Process all the verbs in this packet */
    numberOfVerbs = generalHeader—>numberOfVerbs;
    if (generalHeader—>flags & CONTAINS_SEQUENCED_VERBS)
    {
        /* We need to ack this packet */
        session—>receiveSequence = generalHeader—>sequenceNumber;
        session—>ackPostedTime = buffer—>receiveTime;
        if (generalHeader—>flags & PACKET_WAS_RETRANSMITTED)
            session—>flags |= LAST_RECEIVE_WAS_RETRANSMITTED;
        else
            session—>flags &= ~LAST_RECEIVE_WAS_RETRANSMITTED;
        if (!(session—>flags & SESSION_IS_BEING_TIMED))
            StartTimingSession(session);
    }
    while (numberOfVerbs > 0)
    {
        /* Process each verb */
        verbNumber = *(UINT32 *)buffer—>startOfData;
        if (verbNumber >= NUMBER_OF_DEFINED_VERBS)
        {
            /* This is an unknown verb, just throw the packet away */
            ReleaseReceiveBuffer(buffer);
            RemoveSession(session, ACP_RECEIVED_UNKOWN_VERB);
            return;
        }
        ccode = normalVerbSwitch[verbNumber] (session, buffer, time);
        if (ccode != ACP_SUCCESS)
        {
            /* error processing verb, discard packet */
            RemoveSession(session, ccode);
            ReleaseReceiveBuffer(buffer);
            return;
        }
        numberOfVerbs--;
    }
#if DebugVersion
    if (buffer—>startOfData != buffer—>endOfData)
        NiosPrintf(mh, MT_ABEND, "ProcessReceivedPacket found unused data
"
                "after processing normalVerbSwitch\r\n");
#endif
    if ((session—>receiveSequence - session—>receiveLastAcked) >
            session—>peerWindowUpdateThreshold)
    {
        /* The peer thinks the window is closing, give him a new update */
#if DebugVersion
        session—>windowUpdateAckPackets++;
        Debug(DEB_ACKS) "Notifying peer that window is still open\r\n");
        UpdateNumber(UPDATE_ACKS, session);
        if ((session—>receiveSequence == session—>receiveLastAcked) ||
                ((session—>receiveSequence - session—
>receiveLastAcked) &
                0x80000000))
            NiosPrintf(mh, MT_ABEND, "ProcessReceivedPackets found bad "
                    "sequence info when checking if peer window
update "
                    "is needed\r\n");
#endif
        SendAckPacket(session, time);
    }
    if ((session—>outOfOrderCount != 0) && (generalHeader—>flags &
            CONTAINS_SEQUENCED_VERBS))
```

-continued

```
        {
#if DebugVersion
        if (session—>buffersReceivedOutOfOrder == NULL)
            NiosPrintf(mh, MT_ABEND, "ProcessReceivedPacket found "
                    "outOfOrderCount non zero without any
buffers\r\n");
        if (!(buffer—>flags & RECEIVED_OUT_OF_ORDER))
        {
            /* This is a packet that was missing */
            if (session—>buffersReceivedOutOfOrder—>flags &
                    SELECTIVE_ACK_HAS_BEEN_SENT)
            {
                /* This packet was NAKed and has now arrived */
                session—>missingPacketsArrivingAfterNak++;
                Debug(DEB_OUT_OF_ORDER) "?????Sequence %u arrived
AFTER "
                        "nak, out of order count=%u\r\n",
                        generalHeader—>sequenceNumber,
                        session—>outOfOrderCount);
                UpdateNumber(MISSING_ARRIVED_AFTER_NAK, session);
            }
            else
            {
                /*  This packet never NAKed, it just arrived
                    out of order      */
                session—>missingPacketsArrivingBeforeNak++;
                Debug(DEB_OUT_OF_ORDER) "?????Sequence %u arrived
BEFORE "
                        "nak, out of order count=%u\r\n",
                        generalHeader—>sequenceNumber,
                        session—>outOfOrderCount);
                UpdateNumber(MISSING_ARRIVED_BEFORE_NAK, session);
            }
        }
#endif
        ReleaseReceiveBuffer(buffer);
        /* See if a packet that previously arrived is next */
        if (((struct GeneralHeader *)session—>buffersReceivedOutOfOrder—>
                startOfData)—>sequenceNumber == (session—
>receiveSequence +
                1))
        {
            /* We previously received the next packet out of order */
            buffer = session—>buffersReceivedOutOfOrder;
            session—>buffersReceivedOutOfOrder = buffer—>link;
            session—>outOfOrderCount--;
            /* Now process the packet */
            generalHeader = (struct GeneralHeader *)buffer—>startOfData;
            buffer—>startOfData += sizeof(struct GeneralHeader);
            /* Note: session is already set to the correct session */
#if DebugVersion
            Debug(DEB_PACKET_RECEIVES | DEB_OUT_OF_ORDER)
                    "PROCESSING PREVIOUSLY RECEIVED #%u: "
                    "verbs=%u(%u-%u)\r\n",
                    generalHeader—>sequenceNumber,
                    generalHeader—>numberOfVerbs,
                    generalHeader—>flags & CONTAINS_SYSTEM_VERBS ? 1
: 0,
                    generalHeader—>flags & CONTAINS_SEQUENCED_VERBS
? 1 : 0);
#endif
            time = NiosGetHighResIntervalMarker();
            goto ProcessOutOfOrderPacket;
        }
    }
    else
    {
        ReleaseReceiveBuffer(buffer);
    }
}
void HandleIncorrectSequenceNumberPacket(
        struct SessionStruct *session,
        struct ReceiveBuffer *buffer,
        struct GeneralHeader *generalHeader,
        UINT32 time)
{
    UINT32 numberOfVerbs, verbNumber, ccode, sequenceNumber;
    struct ReceiveBuffer **bufferPointer;
    /* Sequence number is wrong. Determine if this packet is a
```

-continued

```
            duplicate or if missed a packet. */
    if ((generalHeader—>sequenceNumber - (session—>receiveSequence +
            1)) > session—>maximumReceiveWindowSize)
    {
        /*  duplicate of a previously processed packet,
            just throw it away      */
#if DebugVersion
        session—>duplicateProcessedPacketsDiscarded++;
        Debug(DEB_DUPLICATES) "ACPPacketReceived throwing away "
            "DUPLICATE packet #%u (Total processed
duplicates=%u)\r\n",
            generalHeader—>sequenceNumber,
            session—>duplicateProcessedPacketsDiscarded);
        UpdateNumber(DUPLICATES_DISCARDED_AFTER_PROCESSING, session);
#endif
        ReleaseReceiveBuffer(buffer);
        /* may be resending because our last ACK got lost so resend
            the last ACK if it has been a while since it was sent */
        if ((time - session—>lastAckTime) >
                (session—>minimumDuplicateAckInterval))
        {
            SendAckPacket(session, time);
        }
        return;
    }
    for (bufferPointer = &session—>buffersReceivedOutOfOrder;
            *bufferPointer != NULL; bufferPointer = &(*bufferPointer)—
>link)
    {
        sequenceNumber = ((struct GeneralHeader *)((*bufferPointer)—>
                startOfData))—>sequenceNumber;
        if (sequenceNumber >= generalHeader—>sequenceNumber)
        {
            if (sequenceNumber == generalHeader—>sequenceNumber)
            {
                /* This is a duplicate out of order packet, just
release it */
#if DebugVersion
                session—>duplicateUnprocessedPacketsDiscarded++;
                Debug(DEB_DUPLICATES) "ACPPacketReceived OUT OF ORDER
"
                "packet #%u AGAIN and DISCARDED it (%u
unprocessed "
                "duplicates)\r\n",
                generalHeader—>sequenceNumber,
                session—
>duplicateUnprocessedPacketsDiscarded);
                UpdateNumber(DUPLICATES_DISCARDED_BEFORE_PROCESSING,
session);
#endif
                ReleaseReceiveBuffer(buffer);
                return;
            }
            else
            {
                /* The new buffer goes before this one */
                break;
            }
        }
    }
    /*  This packet arrived out of order, we will hold it so it can be
        processed after the missing packets arrive.     */
    /*  Process any system verbs in this packet, skip the
        sequenced verbs.     */
    if (generalHeader—>flags & CONTAINS_SYSTEM_VERBS)
    {
        numberOfVerbs = generalHeader—>numberOfVerbs;
        while (numberOfVerbs > 0)
        {
            /* Process each verb */
            verbNumber = *(UINT32 *)buffer—>startOfData;
            if (verbNumber >= NUMBER_OF_DEFINED_VERBS)
            {
                /*  This is an unknown verb, just throw the
                    packet away */
                ReleaseReceiveBuffer(buffer);
                RemoveSession(session, ACP_RECEIVED_UNKOWN_VERB);
                return;
            }
```

```
                ccode = outOfOrderVerbSwitch[verbNumber] (session, buffer,
time);
            if (ccode != ACP_SUCCESS)
            {
                /* error processing the verb,
                    discard the packet    */
                RemoveSession(session, ccode);
                ReleaseReceiveBuffer(buffer);
                return;
            }
            numberOfVerbs--;
        }
#if DebugVersion
    if (buffer—>startOfData != buffer—>endOfData)
        NiosPrintf(mh, MT_ABEND, "HandleIncorrectSequenceNumberPacket
found "
            "unused data after processing
outOfOrderVerbSwitch\r\n");
#endif
        }
        buffer—>startOfData = (UINT8 *)generalHeader;
        /* Link this buffer onto the out of order list */
        buffer—>link = *bufferPointer;
        *bufferPointer = buffer;
        session—>outOfOrderCount++;
        session—>flags |= NEW_NAK_PENDING;
        if (session—>outOfOrderCount == 1)
        {
            session—>lastNakTime = time;
            if (!(session—>flags & SESSION_IS_BEING_TIMED))
                StartTimingSession(session);
        }
        return;
}
```

Packet Acknowledgment

In general, the receiving endnode 34 acknowledges each packet received but does not necessarily send one acknowledgment packet for each received packet and may delay in sending the acknowledgment ("ack"). In various embodiments according to the invention, the receiving endnode 34 uses one or more different conditions during an acknowledging step 54 to trigger the return of an ack to the sending endnode 32.

One such ack trigger is receipt of a window update size number of unacknowledged packets. During an update initializing step 52, the window update size is set to one. Thus, each of the first two data packets is acknowledged during iterations of the acknowledging step 54 soon after it arrives at the receiving endnode 34.

When the sending endnode 32 receives an ack, it may increase its current send window size during an ack processing step 56. Changes in the send window size are directed toward finding a best window size at which the highest packet throughput is achieved, given the condition of the network 10.

In addition to using the window update size, during the acknowledging step 54 one embodiment of the receiving endnode 34 uses occurrence of an acknowledgment update event and piggybacking opportunities to trigger transmission of an ack to the sending endnode 32. Each time the sending endnode 32 changes the current send window size during the adjusting step 62 it selects a new value for the acknowledgment update event and sends the new value to the receiving endnode 34. The value may be a time interval or a packet count. The value is selected such that the sending endnode 32 will not stop sending data packets due to excessive delay by the receiving endnode 34 in acknowledging received packets.

Using acknowledgment update events reduces the number of ack packets on the network 10, thereby freeing bandwidth for use by data packets. If several data packets arrive before the update event occurs, the corresponding acks may be bundled by the receiving endnode 34 and sent in a single ack packet during the acknowledging step 54. Likewise, if the receiving endnode 34 is given data to transmit to the sending endnode 32 before the update event occurs (somewhat reversing the sending and receiving roles), the ack may be piggybacked on a data packet that is sent from the receiving endnode 34 to the sending endnode 32.

In one embodiment, acknowledgments and negative acknowledgments are managed using routines and structures such as the following:

```
void BuildNakVerbs(
            struct SessionStruct *session,
            struct SendBuffer *sendBuffer,
            UINT32 time)
{
    struct Nak *nakVerb;
    struct SelectiveAck *selectiveAck;
    struct ReceiveBuffer *receiveBuffer;
```

-continued

```
    UINT32 sequence;
    sequence = session—>receiveSequence + 1;
    for (receiveBuffer = session—>buffersReceivedOutOfOrder;
            receiveBuffer != NULL; receiveBuffer = receiveBuffer—>link)
    {
        if (!(receiveBuffer—>flags & SELECTIVE_ACK_HAS_BEEN_SENT) ||
                ((time - receiveBuffer—>selectiveAckTime) >
                (session—>retransmitTimeInterval)))
        {
            /* We need to send this one */
            while (sequence < ((struct GeneralHeader *)receiveBuffer—>
                    startOfData)—>sequenceNumber)
            {
                /* Send a nak for the missing sequence */
                if (SetupSystemVerb(sendBuffer, &nakVerb,
                        sizeof(struct Nak)) != ACP_SUCCESS)
                {
                    return; /* We don't have enough room */
                }
                /* This one is missing NAK it */
                nakVerb—>verbNumber = NAK_VERB;
                nakVerb—>missingSequence = sequence;
                sequence++;
            }
            /* Send a selective ack for this sequence */
            if (SetupSystemVerb(sendBuffer, &selectiveAck,
                    sizeof(struct SelectiveAck)) != ACP_SUCCESS)
            {
                /* We don't have enough room */
                return;
            }
            selectiveAck—>verbNumber = SELECTIVE_ACK_VERB;
            selectiveAck—>receivedSequence = sequence;
            sequence++;
            receiveBuffer—>selectiveAckTime = time;
            receiveBuffer—>flags |= SELECTIVE_ACK_HAS_BEEN_SENT;
        }
        else
        {
            /* not time to send this one again, skip to the next one */
#if DebugVersion
            if (sequence < ((struct GeneralHeader *)receiveBuffer—>
                    startOfData)—>sequenceNumber)
            {
                Debug(DEB_NAKS) ">>>>>Did not include "
                        "NAK of #%u (to %u) because retransmit
interval has "
                        "not been reached\r\n", sequence,
                        ((struct GeneralHeader *)receiveBuffer—>
                        startOfData)—>sequenceNumber - 1);
                session—>nakNotSent += ((struct GeneralHeader *)
                        receiveBuffer—>startOfData)—
>sequenceNumber -
                        sequence;
            }
            Debug(DEB_SELECTIVE_ACKS) ">>>>>Did not include "
                    "selective ACK of #%u because retransmit "
                    "interval has not been reached\r\n",
                    sequence);
            session—>selectiveAckNotSent++;
#endif
            sequence = ((struct GeneralHeader *)receiveBuffer—>
                    startOfData)—>sequenceNumber + 1;
        }
    }
    session—>lastNakTime = time;
    session—>flags &= ~NEW_NAK_PENDING;
    return;
}
UINT32 AcknowledgeAllUpToVerb(
        struct SessionStruct *session,
        struct ReceiveBuffer *buffer,
        UINT32 time)
{
    struct AckAllUpTo *ack;
    struct SendBuffer *sendBuffer;
    struct MessageBlock *message;
    UINT32 numberOfPacketsAcked;
    ack = (struct AckAllUpTo *)buffer—>startOfData;
```

-continued

```
       buffer—>startOfData += sizeof(struct AckAllUpTo);
       if (buffer—>startOfData > buffer—>endOfData)
           /* The packet is too short */
           return (ACP_RECEIVED_MALFORMED_PACKET);
       /* Remove all the acknowledged packets from the retransmit queue */
       numberOfPacketsAcked = 0;
#if DebugVersion
       if (session—>unackedPacketsHead != NULL)
       {
           if (session—>unackedPacketsHead—>prev != NULL)
               NiosPrintf(mh, MT_ABEND, "AcknowledgeAllUpToVerb found "
                       "unackedPacketsHead prev was not NULL\r\n");
           if (session—>unackedPacketsTail == NULL)
               NiosPrintf(mh, MT_ABEND, "AcknowledgeAllUpToVerb found "
                       "unackedPacketsHead was not NULL but "
                       "unackedPacketsTail was NULL\r\n");
           if (session—>unackedPacketsTail—>next != NULL)
               NiosPrintf(mh, MT_ABEND, "AcknowledgeAllUpToVerb found "
                       "unackedPacketTail next was not NULL\r\n");
           if ((session—>unackedPacketsHead—>next == NULL) &&
                   (session—>unackedPacketsTail != session—
>unackedPacketsHead))
               NiosPrintf(mh, MT_ABEND, "AcknowledgeAllUpToVerb found "
                       "unackedPacketsHead next was NULL but "
                       "unackedPacketsTail was not the same as the
head\r\n");
           if ((session—>unackedPacketsTail—>prev == NULL) &&
                   (session—>unackedPacketsTail != session—
>unackedPacketsHead))
               NiosPrintf(mh, MT_ABEND, "AcknowledgeAllUpToVerb found "
                       "unackedPacketsTail prev was NULL but "
                       "unackedPacketsTail was not the same as the
head\r\n");
       }
#endif
       sendBuffer = session—>unackedPacketsHead;
       if ((sendBuffer != NULL) && !((ack—>sequence -
               sendBuffer—>generalHeader—>sequenceNumber) & 0x80000000))
       {
           for (;;)
           {
               /* This packet was acked */
               numberOfPacketsAcked++;
               if ((sendBuffer—>generalHeader—>sequenceNumber ==
                       ack—>sequence) &&
                       !(ack—>flags & ACK_PACKET_WAS_RETRANSMITTED))
               {
                   /* Use this packet to calculate round trip time */
                   UpdateRoundTripTime(session, time,
                           time - sendBuffer—>firstTransmitTime,
                           ack—>timeDelayed);
               }
               if ((session—>transmitStartTime -
                       sendBuffer—>lastTransmitTime) & 0x80000000)
               {
                   /* Update the transmit elapsed time */
                   session—>transmitTimeElapsed +=
                           sendBuffer—>lastTransmitTime -
                           session—>transmitStartTime;
                   session—>transmitStartTime =
                           sendBuffer—>lastTransmitTime;
                   if (session—>transmitTimeElapsed >
                           ((session—>averageRoundTripTime * 2) +
                           TRANSMIT_SAMPLE_TIME))
                       UpdateTransmitThroughputHistory(session);
               }
               while (sendBuffer—>messagesToRelease != NULL)
               {
                   message = sendBuffer—>messagesToRelease;
                   sendBuffer—>messagesToRelease = message—>next;
                   (*message—>releaseCallBack) (message);
               }
               /* Remove this packet from the unacked packet list */
               session—>unackedPacketsHead = sendBuffer—>next;
               if (sendBuffer—>next != NULL)
                   sendBuffer—>next—>prev = NULL;
               /* Release this buffer */
               ReleaseSendBuffer(sendBuffer);
               if (session—>unackedPacketsHead == NULL)
```

-continued

```
                {
                    break;
                }
                sendBuffer = session—>unackedPacketsHead;
                if ((ack—>sequence - sendBuffer—>generalHeader—
>sequenceNumber)
                        & 0x80000000)
                {
                    /* This sequence has not been acked yet */
                    session—>unackedPacketsHead—>prev = NULL;
                    break;
                }
            }
        }
    }
#if DebugVersion
    if (session—>unackedPacketsHead != NULL)
    {
        if (session—>unackedPacketsHead—>prev != NULL)
            NiosPrintf(mh, MT_ABEND, "AcknowledgeAllUpToVerb-2 found "
                        "unackedPacketsHead prev was not NULL\r\n");
        if (session—>unackedPacketsTail == NULL)
            NiosPrintf(mh, MT_ABEND, "AcknowledgeAllUpToVerb-2 found "
                        "unackedPacketsHead was not NULL but "
                        "unackedPacketsTail was NULL\r\n");
        if (session—>unackedPacketsTail—>next != NULL)
            NiosPrintf(mh, MT_ABEND, "AcknowledgeAllUpToVerb-2 found "
                        "unackedPacketTail next was not NULL\r\n");
        if ((session—>unackedPacketsHead—>next == NULL) &&
                (session—>unackedPacketsTail != session—
>unackedPacketsHead))
            NiosPrintf(mh, MT_ABEND, "AcknowledgeAllUpToVerb-2 found "
                        "unackedPacketsHead next was NULL but "
                        "unackedPacketsTail was not the same as the
head\r\n");
        if ((session—>unackedPacketsTail—>prev == NULL) &&
                (session—>unackedPacketsTail != session—
>unackedPacketsHead))
            NiosPrintf(mh, MT_ABEND, "AcknowledgeAllUpToVerb-2 found "
                        "unackedPacketsTail prev was NULL but "
                        "unackedPacketsTail was not the same as the
head\r\n");
    }
#endif
    if (ack—>flags & ACK_RECEIVE_CONGESTION_OCCURING)
    {
        DecreaseSendWindowSize(session, 2);
    }
    else
    {
        if (session—>flags & WINDOW_CLOSED_SINCE_ACK)
        {
            IncreaseSendWindowSize(session, numberOfPacketsAcked);
            session—>flags &= ~WINDOW_CLOSED_SINCE_ACK;
        }
    }
    /* We need to include selective acked packets in sendLastAcked,
        otherwise we can get to a state where an ack was lost but
        the retransmit list is empty. */
    if (session—>unackedPacketsHead == NULL)
        session—>sendLastAcked = session—>sendSequence;
    else
        session—>sendLastAcked = session—>unackedPacketsHead—>
                generalHeader—>sequenceNumber - 1;
    if ((session—>flags & WINDOW_IS_CLOSED) &&
            ((session—>sendSequence - session—>sendLastAcked) <
            session—>sendWindowSize))
    {
#if DebugVersion
        Debug(DEB_WINDOW_CLOSE) "WINDOW is now OPEN\r\n");
        UpdateMessage(WINDOW_CLOSE_OCCURING, session, FALSE);
        if (session—>nextSendLink != NULL)
            NiosPrintf(mh, MT_ABEND, "AcknowledgeAllUpToVerb found the "
                        "window closed and the nextSendLink not
NULL\r\n");
#endif
        session—>flags &= ~WINDOW_IS_CLOSED;
        ScheduleSessionToSend(session);
    }
    return (ACP_SUCCESS);
```

-continued

```
}
UINT32 NakVerb(
        struct SessionStruct *session,
        struct ReceiveBuffer *buffer,
        UINT32 time)
{
    struct Nak *nak;
    struct SendBuffer *sendBuffer;
    nak = (struct Nak *)buffer—>startOfData;
    buffer—>startOfData += sizeof(struct Nak);
    if (buffer—>startOfData > buffer—>endOfData)
        /* The packet is too short */
        return (ACP_RECEIVED_MALFORMED_PACKET);
#if DebugVersion
    session—>nakVerbsReceived++;
    Debug(DEB_NAKS) ">>>>>NAK of #%u sent up to #%u\r\n",
            nak—>missingSequence, session—>sendSequence);
    UpdateNumber(NAK_VERBS_RECEIVED, session);
#endif
    /* Locate the missing packet */
    for (sendBuffer = session—>unackedPacketsHead; sendBuffer != NULL;
            sendBuffer = sendBuffer—>next)
    {
        if (sendBuffer—>generalHeader—>sequenceNumber ==
                nak—>missingSequence)
        {
            /* Retransmit the lost packet */
            if ((sendBuffer—>flags & TRANSMIT_IS_COMPLETE) &&
                    ((time - sendBuffer—>lastTransmitTime) >=
                    (session—>minimumDuplicatePacketInterval)))
            {
                DecreaseSendWindowSize(session, 1);
                /* Retransmit the missing packet */
                ResendSequencedPacket(session, sendBuffer, time);
            }
#if DebugVersion
            else
            {
                Debug(DEB_NAKS) "!!!!!NAK did not retransmit, "
                        "transmit complete=%u, time
interval=%u\r\n",
                        (sendBuffer—>flags &
TRANSMIT_IS_COMPLETE),
                        (time - sendBuffer—>lastTransmitTime));
                session—>nakNotRetransmitted++;
            }
#endif
            return (ACP_SUCCESS);
        }
    }
#if DebugVersion
    Debug(DEB_ALWAYS) "NakVerb could not find the nak'd packet\r\n");
#endif
    return (ACP_SUCCESS);
}
UINT32 SelectiveAckVerb(
        struct SessionStruct *session,
        struct ReceiveBuffer *buffer,
        UINT32 time)
{
    struct SelectiveAck *selectiveAck;
    struct SendBuffer *sendBuffer;
    struct MessageBlock *message, **messageLink;
    if (session == 0)
        ;    /* Unused variable */
    if (time == 0)
        ;    /* Unused variable */
    selectiveAck = (struct SelectiveAck *)buffer—>startOfData;
    buffer—>startOfData += sizeof(struct SelectiveAck);
    if (buffer—>startOfData > buffer—>endOfData)
        /* The packet is too short */
        return (ACP_RECEIVED_MALFORMED_PACKET);
#if DebugVersion
    Debug(DEB_SELECTIVE_ACKS) ">>>>>Selective ACK of #%u (have sent "
            "up to #%u)\r\n",
            selectiveAck—>receivedSequence, session—>sendSequence);
#endif
    /* Locate the selective acked packet */
    for (sendBuffer = session—>unackedPacketsHead; sendBuffer != NULL;
```

-continued

```
                    sendBuffer = sendBuffer—>next)
        {
            if (sendBuffer—>generalHeader—>sequenceNumber ==
                    selectiveAck—>receivedSequence)
            {
#if DebugVersion
                if (session—>unackedPacketsHead—>prev != NULL)
                    NiosPrintf(mh, MT_ABEND, "SelectiveAckVerb found "
                            "unackedPacketsHead prev was not
NULL\r\n");
                if (session—>unackedPacketsTail == NULL)
                    NiosPrintf(mh, MT_ABEND, "SelectiveAckVerb found "
                            "unackedPacketsHead was not NULL but "
                            "unackedPacketsTail was NULL\r\n");
                if (session—>unackedPacketsTail—>next != NULL)
                    NiosPrintf(mh, MT_ABEND, "SelectiveAckVerb found "
                            "unackedPacketTail next was not
NULL\r\n");
                if ((session—>unackedPacketsHead—>next == NULL) &&
                        (session—>unackedPacketsTail !=
                        session—>unackedPacketsHead))
                    NiosPrintf(mh, MT_ABEND, "SelectiveAckVerb found "
                            "unackedPacketsHead next was NULL but "
                            "unackedPacketsTail was not the same "
                            "as the head\r\n");
                if ((session—>unackedPacketsTail—>prev == NULL) &&
                        (session—>unackedPacketsTail !=
                        session—>unackedPacketsHead))
                    NiosPrintf(mh, MT_ABEND, "SelectiveAckVerb found "
                            "unackedPacketsTail prev was NULL but "
                            "unackedPacketsTail was not the same "
                            "as the head\r\n");
#endif
                /* This packet was acked */
                if (sendBuffer—>prev == NULL)
                {
                    /* This buffer is at the head of the list */
                    session—>unackedPacketsHead = sendBuffer—>next;
                    if (sendBuffer—>next != NULL)
                        session—>unackedPacketsHead—>prev = NULL;
                    /*   We don't need to set the tail when the head is
NULL */
                    /* Release the message buffers now */
                    while (sendBuffer—>messagesToRelease != NULL)
                    {
                        message = sendBuffer—>messagesToRelease;
                        sendBuffer—>messagesToRelease = message—>next;
                        (*message—>releaseCallBack) (message);
                    }
                }
                else
                {
                    sendBuffer—>prev—>next = sendBuffer—>next;
                    if (sendBuffer—>next == NULL)
                        session—>unackedPacketsTail = sendBuffer—>prev;
                    else
                        sendBuffer—>next—>prev = sendBuffer—>prev;
                    /* Move the messages to release to the prior packet */
                    messageLink = &sendBuffer—>prev—>messagesToRelease;
                    while (*messageLink != NULL)
                        messageLink = &(*messageLink)—>next;
                    *messageLink = sendBuffer—>messagesToRelease;
                    sendBuffer—>messagesToRelease = NULL;
                }
                /* Remove the acknowledged packet from the retransmit queue
*/
                ReleaseSendBuffer(sendBuffer);
#if DebugVersion
                session—>unackedTransmits--;
                UpdateNumber(TRANSMITS_UNACKED, session);
                if (session—>unackedPacketsHead != NULL)
                {
                    if (session—>unackedPacketsHead—>prev != NULL)
                        NiosPrintf(mh, MT_ABEND, "SelectiveAckVerb-2
found "
                                "unackedPacketsHead prev was not
NULL\r\n");
                    if (session—>unackedPacketsTail == NULL)
                        NiosPrintf(mh, MT_ABEND, "SelectiveAckVerb-2
```

-continued

```
found "
                                   "unackedPacketsHead was not NULL but
"
                                   "unackedPacketsTail was NULL\r\n");
                    if (session—>unackedPacketsTail—>next != NULL)
                         NiosPrintf(mh, MT_ABEND, "SelectiveAckVerb-2
found "
                                   "unackedPacketTail next was not
NULL\r\n");
                    if ((session—>unackedPacketsHead—>next == NULL) &&
                         (session—>unackedPacketsTail !=
                         session—>unackedPacketsHead))
                         NiosPrintf(mh, MT_ABEND, "SelectiveAckVerb-2
found "
                                   "unackedPacketsHead next was NULL
but "
                                   "unackedPacketsTail was not the same
as "
                                   "the head\r\n");
                    if ((session—>unackedPacketsTail—>prev == NULL) &&
                         (session—>unackedPacketsTail !=
                         session—>unackedPacketsHead))
                         NiosPrintf(mh, MT_ABEND, "SelectiveAckVerb-2
found "
                                   "unackedPacketsTail prev was NULL
but "
                                   "unackedPacketsTail was not the same
"
                                   "as the head\r\n");
               }
#endif
               /*
               We need to check for the window opening here because
               a dropped ack all up to packet could get us stuck
otherwise.
               */
               if (session—>unackedPacketsHead == NULL)
                    session—>sendLastAcked = session—>sendSequence;
               else
                    session—>sendLastAcked = session—>unackedPacketsHead—>
                              generalHeader—>sequenceNumber - 1;
               if ((session—>flags & WINDOW_IS_CLOSED) &&
                         ((session—>sendSequence - session—
>sendLastAcked) <
                         session—>sendWindowSize))
               {
#if DebugVersion
                    Debug(DEB_WINDOW_CLOSE) "WINDOW is now OPEN\r\n");
                    UpdateMessage(WINDOW_CLOSE_OCCURING, session, FALSE);
                    if (session—>nextSendLink != NULL)
                         NiosPrintf(mh, MT_ABEND, "AcknowledgeAllUpToVerb
"
                                   "found the window closed and the "
                                   "nextSendLink not NULL\r\n");
#endif
                    session—>flags &= ~WINDOW_IS_CLOSED;
                    ScheduleSessionToSend(session);
               }
               return (ACP_SUCCESS);
          }
     }
#if DebugVersion
     Debug(DEB_SELECTIVE_ACKS) "!!!!!Selective ACK found #%u was "
               "previously released\r\n", selectiveAck—>receivedSequence);
#endif
     return (ACP_SUCCESS);
}
void SendAckPacket(
          struct SessionStruct *session,
          UINT32 time)
{
     struct SendBuffer *sendBuffer;
     UINT32 ccode, timeSinceLastNak;
     /* Build the next physical packet */
     ccode = GetNewSendBuffer(session, &sendBuffer);
     if (ccode != ACP_SUCCESS)
     {
          /* The network support module did not have any send buffers */
          Try again later.
```

```
            return;
        }
        BuildAckVerb(session, sendBuffer, time);
        if (session—>outOfOrderCount != 0)
        {
            timeSinceLastNak = time - session—>lastNakTime;
            if (((session—>flags & NEW_NAK_PENDING) &&
                    ((timeSinceLastNak) >
                    session—>minimumDelayedNakTimeInterval)) ||
                    ((timeSinceLastNak) > session—
>retransmitTimeInterval))
                /* Piggyback the nak with this packet */
                BuildNakVerbs(session, sendBuffer, time);
        }
        SendSystemPacket(session, sendBuffer);
}
void BuildAckVerb(
        struct SessionStruct *session,
        struct SendBuffer *sendBuffer,
        UINT32 time)
{
    struct AckAllUpTo *ackVerb;
#if DebugVersion
    Debug(DEB_ACKS) "Including ACK UP TO prev=%u new=%u\r\n",
            session—>receiveLastAcked, session—>receiveSequence);
#endif
    if (SetupSystemVerb(sendBuffer, &ackVerb, sizeof(struct AckAllUpTo))
            != ACP_SUCCESS)
    {
        return; /* We don't have enough room */
    }
    ackVerb—>verbNumber = ACKNOWLEDGE_ALL_UP_TO_VERB;
    ackVerb—>sequence = session—>receiveSequence;
    ackVerb—>timeDelayed = time - session—>ackPostedTime;
    ackVerb—>flags = 0;
    if (session—>flags & RECEIVE_CONGESTION_OCCURING)
    {
        ackVerb—>flags != ACK_RECEIVE_CONGESTION_OCCURING;
        session—>flags &= ~RECEIVE_CONGESTION_OCCURING;
    }
    if (session—>flags & LAST_RECEIVE_WAS_RETRANSMITTED)
    {
        ackVerb—>flags |= ACK_PACKET_WAS_RETRANSMITTED;
    }
    session—>receiveLastAcked = session—>receiveSequence;
    session—>lastAckTime = time;
    return;
}
```

The acks are received and processed by the sending endnode 32 during an ack processing step 56. The processing ensures that unacknowledged packets will be retransmitted.

Interpacket Gap and Metering

During a gap measuring step 58, the receiving endnode 34 also measures the time gap between receipt of the first data packet and receipt of the second data packet. This value is stored in RAM as the current average interpacket gap. Whenever the average interpacket gap value changes significantly, the receiving endnode 34 informs the sending endnode 32 of the new value.

One embodiment tracks the interpacket gap for at least MINIMUM_PACKETS_IN_RECEIVE_GAP_SAMPLE (fifteen) packets and MINIMUM_SAMPLE_TIME (one) second. It then computes the average interpacket gap during this sample period. The embodiment tracks the smallest sample out of the last four sample periods. As new samples are taken, and old ones are forgotten, the smallest sample in the history can change. When the smallest sample in the history changes, the receiving endnode 34 sends that value as the new interpacket gap value to the sender 32.

During a gap change processing step 60, the sending endnode 32 reacts by imposing a metering delay on subsequently placed packets during iterations of the placing step 48. The metering delay is preferably slightly less than the average interpacket gap between data packet transmissions. A delay slightly less than the interpacket gap is preferable to a delay equal to that gap because the lesser delay allows the system 10 to measure increases in the network packet delivery rate. Setting the send rate slightly faster than the measured receive rate allows the receiving endnode 34 to detect increases in the packet delivery rate by noting successful arrivals at the faster rate.

Metering ensures that data packets are placed on the network 10 at a rate that is not too fast for the slowest intermediate node 36 in the route between the sending endnode 32 and the receiving endnode 34. Metering prevents bursts caused by intermittent data and helps avoid network congestion and the resulting dropped packets. Combining dynamic packet metering with dynamic window sizing also reduces the number of extra packets placed on the network 10 when an expected ack does not arrive.

Verbs

As illustrated in the code and pseudo-code herein, communication and coordination between the sending endnode 32 and the receiving endnode 34 is accomplished in part by transmitting "verbs" between these endnodes. The set of verbs used may vary between embodiments. Selected verbs illustrated in the code are also discussed below.

A CONNECT_REQUEST_VERB is used by the sending endnode 32 to request a connection with the receiving endnode 34, which is specified by its network address or an equivalent identifier. A CONNECT_REPLY_VERB sent in response to the CONNECT_REQUEST_VERB contains a code indicating success or failure. If the connection was successfully obtained, information needed by routines below the transport layer is also sent.

A DISCONNECT_REQUEST_VERB is used to cleanly sever the connection. It may be sent by either endnode 32, 34 to the other endnode. A DISCONNECT_REPLY_VERB is sent in response to the DISCONNECT_REQUEST_VERB and contains a code indicating either success or a failure, such as a failure to locate the specified connection handle.

An ACKNOWLEDGE_ALL_UP_TO_VERB is used in bundling acknowledgments; see the BuildAckVerb( ) routine above.

A COMPLETE_MESSAGE_VERB and a PARTIAL_MESSAGE_VERB are used to distinguish between packets that belong to different messages defined by the layer(s) above the transport layer, as illustrated in the following:

```
void SendConnectionData(
        struct ConnectionStruct *connection,
        struct SendBuffer *sendBuffer,
        UINT32 *connectionFinishedSendingFlag)
{
    struct PartialMessage *partialMessageVerb;
    struct CompleteMessage *completeMessageVerb;
    struct MessageBlock *message;
    UINT32 fragmentLength;
    do
    {
        message = connection—>sendMessageHead;
        if (!(sendBuffer—>flags & FRAGMENT_ADDRESS_IS_SET_TO_BUFFER))
        {
#if DebugVersion
            if (sendBuffer—>remainingFragments == 0)
                NiosPrintf(mh, MT_ABEND, "Send found no available fragments "
                            "in the send buffer\r\n");
#endif
            sendBuffer—>packetFragment++;
            sendBuffer—>packetFragment—>address = sendBuffer—>bufferPosition;
            sendBuffer—>packetFragment—>length = 0;
            sendBuffer—>remainingFragments--;
            sendBuffer—>flags |= FRAGMENT_ADDRESS_IS_SET_TO_BUFFER;
        }
        sendBuffer—>generalHeader—>numberOfVerbs++;
        sendBuffer—>generalHeader—>flags |= CONTAINS_SEQUENCED_VERBS;
        if ((connection—>sendMessageOffset != 0) ||
            ((message—>totalMessageLength +
              sizeof(struct CompleteMessage))
              > sendBuffer—>remainingBufferLength))
        {
            /* Set up a partial message header */
            partialMessageVerb = (struct PartialMessage *)sendBuffer—>
                    bufferPosition;
            sendBuffer—>bufferPosition += sizeof(struct PartialMessage);
            sendBuffer—>remainingBufferLength -=
                    sizeof(struct PartialMessage);
            sendBuffer—>packetFragment—>length +=
                    sizeof(struct PartialMessage);
            partialMessageVerb—>verbNumber = PARTIAL_MESSAGE_VERB;
            partialMessageVerb—>connectionNumber =
                    connection—>remoteConnectionNumber;
            partialMessageVerb—>messageNumber =
                    connection—>sendMessageNumber;
            if ((message—>totalMessageLength -
                    connection—>sendMessageOffset) >
                    sendBuffer—>remainingBufferLength)
                partialMessageVerb—>thisSegmentLength =
                        sendBuffer—>remainingBufferLength;
            else
                partialMessageVerb—>thisSegmentLength =
                        message—>totalMessageLength -
                        connection—>sendMessageOffset;
            partialMessageVerb—>offsetInMessage =
                    connection—>sendMessageOffset;
            partialMessageVerb—>totalMessageLength =
                    message—>totalMessageLength;
        }
        else
        {
```

-continued

```
                /* Set up a complete message header */
                completeMessageVerb = (struct CompleteMessage *)sendBuffer—>
                        bufferPosition;
                sendBuffer—>bufferPosition += sizeof(struct
CompleteMessage);
                sendBuffer—>remainingBufferLength -= sizeof(struct
CompleteMessage);
                sendBuffer—>packetFragment—>length +=
                        sizeof(struct CompleteMessage);
                completeMessageVerb—>verbNumber = COMPLETE_MESSAGE_VERB;
                completeMessageVerb—>connectionNumber =
                        connection—>remoteConnectionNumber;
                completeMessageVerb—>messageNumber =
                        connection—>sendMessageNumber;
                completeMessageVerb—>totalMessageLength =
                        message—>totalMessageLength;
            }
            for (;;)
            {
                if (connection—>sendMessageOffset == 0)
                {
                    if (message—>fragment[0].length <=
                            sendBuffer—>remainingBufferLength)
                    {
                        /* The entire fragment fits */
                        SendMessageData(sendBuffer,
message—>fragment[0].address,
                                message—>fragment[0].length);
                        if (message—>numberOfFragments == 1)
                            break;
                        else
                        {
                            connection—>sendMessageOffset =
                                    message—>fragment[0].length;
                            connection—>sendCurrentFragment = 1;
                            connection—>sendFragmentOffset = 0;
                        }
                    }
                    else
                    {
                        /* Only part of the fragment fits */
                        connection—>sendMessageOffset = sendBuffer—>
                                remainingBufferLength;
                        connection—>sendFragmentOffset = sendBuffer—>
                                remainingBufferLength;
                        connection—>sendCurrentFragment = 0;
                        SendMessageData(sendBuffer,
message—>fragment[0].address,
                                sendBuffer—>remainingBufferLength);
                        /* The buffer is full */
                        return;
                    }
                }
                else
                {
                    fragmentLength = message—>fragment[connection—>
                            sendCurrentFragment].length -
                            connection—>sendFragmentOffset;
                    if (fragmentLength <=
sendBuffer—>remainingBufferLength)
                    {
                        /* The remainder of this fragment will fit */
                        SendMessageData(sendBuffer,
                                ((UINT8 *)message—>fragment[
    connection—>sendCurrentFragment].address) +
                                    connection—>sendFragmentOffset,
                                    fragmentLength);
                        connection—>sendCurrentFragment++;
                        if (connection—>sendCurrentFragment >=
                                message—>numberOfFragments)
                            break;
                        connection—>sendMessageOffset += fragmentLength;
                        connection—>sendFragmentOffset = 0;
                    }
                    else
                    {
                        /* Only part of the fragment fits */
                        fragmentLength =
sendBuffer—>remainingBufferLength;
```

```
                SendMessageData(sendBuffer,
                            ((UINT8 *)message—>fragment[
    connection—>sendCurrentFragment].address) +
                                    connection—>sendFragmentOffset,
                                    fragmentLength);
                            connection—>sendMessageOffset += fragmentLength;
                            connection—>sendFragmentOffset +=
fragmentLength;
                        /* The buffer is full */
                        return;
                    }
                }
            }
            /*  All the rest of this message fits in this packet
                Remove the message from the send queue      */
            connection—>sendMessageNumber++;
            connection—>sendMessageOffset = 0;
            connection—>sendMessageHead = message—>next;
            /* Put it on the waiting queue */
            message—>next = sendBuffer—>messagesToRelease;
            sendBuffer—>messagesToRelease = message;
            if (connection—>sendMessageHead == NULL)
            {
                *connectionFinishedSendingFlag = TRUE;
                return;
            }
    } while (sendBuffer—>remainingBufferLength >=
            (sizeof(struct PartialMessage) +
            MINIMUM_LOOKAHEAD_DATA_SIZE));
}
```

A NAK_VERB and a SELECTIVE_ACK_VERB are used for notification that a packet was dropped and for notification that certain packets were not dropped, respectively.

A SET_SEND_PACKET_GAP_VERB is sent from the receiving endnode 34 to the sending endnode 32 during the measuring step 58 and is processed there during the gap processing step 60.

A SET_WINDOW_UPDATE_THRESHOLD_VERB is sent from the receiving endnode 34 to the sending endnode 32 during the measuring step 58 and is processed there during the adjusting step 62.

A REQUEST_NEW_MAX_WINDOW_SIZE_ VERB is sent from the sending endnode 32 to the receiving endnode 34 to initiate the window limiting step 40. The resulting maximum send window size is sent to the sending endnode 32 as part of a NEW_MAX_WINDOW_SIZE_ VERB.

A CREATE_SESSION_REQUEST_VERB and a corresponding CREATE_SESSION_REPLY_VERB are used to create a session.

Status Codes

In one embodiment of a transport layer according to the present invention, the status codes described below may be reported. Those of skill in the art will appreciate that other status codes may be detected and reported in other embodiments, depending on the capabilities of the network operating system, network 10 hardware (including servers, bridges, and routers), and other factors.

ACP_SUCCESS means the function succeeded.

ACP_DISCONNECT_WAS_CALLED means the function was terminated because disconnection was requested.

ACP_ADDRESS_NOT_FOUND means the address in question is invalid, does not exist, or is not currently accessible.

ACP_ALREADY_REGISTERED means the service name and type were already registered with the transport layer to receive connections.

ACP_BAD_BUFFER_LENGTH means the address buffer provided is not large enough to hold the network address.

ACP_CONNECTION_REJECTED_BY_SERVICE means the service refused to accept the connection. This could happen if the service lacks sufficient available resources or available licenses.

ACP_CONNECTION_TIMED_OUT means the existing connection failed.

ACP_DUPLICATE_CONNECTION_NOT_ SUPPORTED means the peer endnode did not register a handler for duplicating a connection.

ACP_DUPLICATE_CREATE_SESSION_REQUEST means a previous request to create a session using the same unique identifier was already processed; the current request is a duplicate and is being ignored.

ACP_ENCRYPTION_NOT_AVAILABLE means data transmitted on this connection will not be encrypted. This may occur if one or both endnodes lacks a loaded encryption module, or if the loaded modules use incompatible encryption algorithms.

ACP_INTERNAL_ERROR means a unexpected state was encountered by the software implementing the transport layer according to the invention. This may be caused by a programming error.

ACP_INVALID_CONNECTION_HANDLE means the specified connection handle did not identify an active connection.

ACP_INVALID_NETWORK_TYPE means the specified network address type is not supported by this implementation.

ACP_INVALID_SERVICE_HANDLE means the specified service handle did not identify an active registered service.

ACP_INVALID_SERVICE_NAME_OR_TYPE means the specified service name or type is not supported by this implementation.

ACP_MEMORY_ALLOCATION_ERROR means memory was not available for buffers, local data structures, or other needs.

ACP_NETWORK_SUPPORT_NOT_LOADED means the network support module for the specified address type is not currently loaded (used on NetWare® systems).

ACP_NO_ROOM_IN_BUFFER means a buffer was allocated but is full.

ACP_NOT_REGISTERED means the specified service was not registered and thus cannot be used.

ACP_PEER_REINITIALIZED means a request to establish a new session was received from the opposite endnode. This typically occurs when that endnode has been rebooted and is trying to restore connections.

ACP_PEER_REJECTED_DUPLICATE_CONNECTION_REQUEST means the peer endnode registered handler for processing duplicate connection requests returned an error code.

ACP_PEER_REQUESTED_DISCONNECT means the peer endnode requested disconnection.

ACP_RECEIVE_BUFFER_WAS_TOO_SMALL means the buffer provided to the transport layer to receive incoming messages is too small.

ACP_RECEIVED_MALFORMED_PACKET means the format of the received packet was incorrect, such as when unexpected or invalid data is encountered while processing the packet. This could be the result of a LAN hardware problem that is corrupting data on the network 10.

ACP_RECEIVED_MESSAGE_WAS_NOT_ACCEPTED means the attempt to buffer an incoming message failed.

ACP_RECEIVED_UNKNOWN_VERB means the format of the received packet was corrupt or that incompatible versions of the transport layer are in use by the two endnodes. This error and ACP_RECEIVED_MALFORMED_PACKET may be equivalent.

ACP_THREAD_ARM_ERROR means the network operating system returned an error when the transport layer attempted to schedule a thread. This occurs on multi-threaded systems, such as NetWare SMP®, when there is a problem with the system scheduler.

ACP_UNLOADING means the transport layer loadable module is being unloaded, and the connection is therefore being terminated.

Summary

After an initial startup period a transport layer operating according to the present invention determines the best send window size and interpacket gap interval to maximize throughput in the current network environment. The transport layer continues to check throughput and reevaluate the selected send window size, allowing the transport layer to dynamically adapt to changes in available bandwidth, round trip time, and other network conditions. The transport layer also meters placement of packets to avoid congestion and dynamically adapts to changing network conditions by updating the packet metering rate as needed. In addition, the transport layer reduces congestion by reducing the number of ack packets through bundling and piggybacking, and by combining packets from multiple connections.

Those of skill in the art will readily distinguish between required and allowed sequences of steps in the methods of the present invention. That is, some steps depend on the results of earlier steps and must therefore be completed after such earlier steps. For instance, a packet cannot be received at the receiving endnode 34 until after it has been sent by the sending endnode 32. But other steps are free of such interdependencies and may therefore be performed in an order different from the order depicted in the Figures.

In particular embodiments, different steps and operations described herein may be performed in one sequence or in concurrent sequences using threads or other multiprocessing techniques. The debugging and error-detection/correction steps in the code may be readily enhanced, removed, or modified by those of skill in the art, to display variable values, detect null pointers, detect improper interrupt settings, and so forth.

Although reference is made herein to the transport layer of the OSI model, those of skill in the art will appreciate that some networks are better described using other models. The present invention is readily adapted for use in that portion of such a network which corresponds generally in purpose with the OSI transport layer even if the remaining portions of the network do not correspond to other OSI layers.

Likewise, although particular apparatus and article embodiments of the present invention are expressly illustrated and described herein, it will be appreciated that additional and alternative apparatus and article embodiments may be formed according to methods of the present invention. Similarly, although particular method steps of the present invention are expressly described, those of skill in the art may readily determine additional and alternative steps in accordance with the apparatus and articles of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method of controlling the transmission of packets over a computer network between a sending endnode and a receiving endnode on the network, the packets including a plurality of data packets which are capable of carrying data over the network, the method comprising the computer-implemented steps of:

selecting a window size which limits the amount of outstanding data, outstanding data being data that has been sent in a data packet from the sending endnode but has not yet been acknowledged by the receiving endnode;

selecting a metering interval which limits the rate at which data packets are placed on the network; and placing packets on the network for transmission from the sending endnode to the receiving endnode at times which are determined in response to the window size and the metering interval.

2. The method of claim 1, wherein the step of selecting a window size comprises the steps of:

measuring packet throughput from the sending endnode to the receiving endnode at a plurality of different window sizes; and selecting the smallest window size at which the measured packet throughput is greatest.

3. The method of claim 2, wherein the step of selecting the window size comprises determining an excessive window size at which throughput no longer increases.

4. The method of claim 1, wherein the step of selecting a metering interval comprises the steps of:

measuring interpacket gaps between packets arriving at an endnode; and determining the metering interval of the sending endnode based on the measured interpacket gaps.

5. The method of claim 4, wherein the step of determining the metering interval comprises determining an average interpacket gap time for packets received at the receiving endnode.

6. The method of claim 5, further comprising the computer-implemented step of sending a packet from the receiving endnode to the sending endnode containing a new average interpacket gap time in response to a change in the average interpacket gap time.

7. The method of claim 1, further comprising the computer-implemented step of multiplexing a plurality of logical connections over a single transport session.

8. The method of claim 1, wherein the step of placing packets on the network for transmission comprises the step of using packets that have a network-layer-independent internal format to generate packets that have a format which is tailored to a predetermined network layer.

9. The method of claim 8, wherein the generated packets have a format that is tailored to a network layer selected from the group consisting of IP, IPX, and ATM network layers.

10. The method of claim 1, further comprising the computer-implemented step of filling a single data packet with data from a plurality of connections.

11. The method of claim 1, further comprising the computer-implemented step of sending an acknowledgment from the receiving endnode to the sending endnode in response to receipt of a data packet by the receiving endnode and also in response to an occurrence of an acknowledgment update event.

12. The method of claim 11, wherein the acknowledgment update event is selected from the group of events consisting of:

the passage of at least an acknowledgment update time interval amount of time since the most recent sending of an acknowledgment by the receiving endnode, and the receipt of at least an acknowledgment update packet count number of packets at the receiving endnode since the most recent sending of an acknowledgment by the receiving endnode.

13. The method of claim 12, further comprising the computer-implemented step of sending a packet containing the acknowledgment update packet count from the sending endnode to the receiving endnode in response to receiving notice of a change in the window size of the sending endnode.

14. The method of claim 1, further comprising the computer-implemented step of sending a plurality of acknowledgments in one packet from the receiving endnode to the sending endnode to acknowledge receipt by the receiving endnode of a corresponding plurality of data packets.

15. The method of claim 1, further comprising the computer-implemented step of sending an acknowledgment in a second data packet from the receiving endnode to the sending endnode in response to receipt of a first data packet by the receiving endnode.

16. The method of claim 1, further comprising the computer-implemented step of receiving at the sending endnode an address change packet which specifies a new address for the receiving endnode, the step of placing packets on the network further comprising placing a data packet on the network for transmission to the new address.

17. The method of claim 16, further comprising the step of validating the address change packet prior to placing a data packet on the network for transmission to the new address.

18. A method of controlling the transmission of packets over a computer network between a sending endnode and a receiving endnode on the network, the packets including a plurality of data packets which are capable of carrying data over the network, the method comprising the computer-implemented steps of:

dynamically selecting a preferred window size which limits the amount of outstanding data by measuring packet throughput from the sending endnode to the receiving endnode and determining the preferred window size based on the measured packet throughput, outstanding data being data that has been sent in a data packet from the sending endnode but has not yet been acknowledged by the receiving endnode; and placing packets on the network for transmission from the sending endnode to the receiving endnode such that the window size is an upper bound on the number of unacknowledged packets.

19. The method of claim 18, wherein the step of placing packets on the network for transmission comprises the step of using packets that have a network-layer-independent internal format to generate packets that have a format which is tailored to a predetermined network layer.

20. The method of claim 18, further comprising the computer-implemented step of sending an acknowledgment from the receiving endnode to the sending endnode in response to receipt of a data packet by the receiving endnode and also in response to an occurrence of an acknowledgment update event.

21. The method of claim 18, further comprising the computer-implemented step of sending an acknowledgment in a second data packet from the receiving endnode to the sending endnode in response to receipt of a first data packet by the receiving endnode.

22. The method of claim 18, further comprising the computer-implemented step of receiving at the sending endnode an address change packet which specifies a new address for the receiving endnode, the step of placing packets on the network further comprising placing a data packet on the network for transmission to the new address.

23. The method of claim 18, wherein the step of dynamically selecting a preferred window size further comprises the computer-implemented steps of:

successively increasing a current window size and then measuring the packet throughput associated with the current window size until a maximum associated throughput is identified; and then selecting as the preferred window size the smallest window size with which the maximum packet throughput is associated.

24. The method of claim 23, further comprising the computer-implemented step of selecting a metering interval which limits the rate at which data packets are placed on the network during the placing step.

25. The method of claim 24, wherein the step of selecting a metering interval comprises the steps of:

measuring interpacket gaps between packets arriving at an endnode;

determining the metering interval of the sending endnode based on the measured interpacket gaps.

26. The method of claim 18, wherein the step of dynamically selecting a preferred window size further comprises the computer-implemented steps of:

designating an initial window size as a current window size;

installing the current window size as an upper bound on the number of unacknowledged packets;

measuring packet throughput from the sending endnode to the receiving endnode after the installing step;

determining whether the measured throughput associated with the current window size is no greater than a measured throughput associated with a previous window size; and choosing a subsequent action based on the outcome of the determining step, wherein the subsequent action comprises selecting a previous window size as the preferred window size if the measured throughput associated with the current window size is no greater than the measured throughput associated with that previous window size, and the subsequent action otherwise comprises replacing the current window size with a designated larger window size and then repeating the installing, measuring, determining, and choosing steps.

27. A method of controlling the transmission of packets over a computer network between a sending endnode and a receiving endnode on the network, the method comprising the computer-implemented steps of:

associating a plurality of logical connections with a single transport session;

placing a packet on the network as part of the single transport session for transmission from the sending endnode to the receiving endnode; and selecting a metering interval which limits the rate at which packets are placed on the network and wherein the placing step places packets on the network for transmission from the sending endnode to the receiving endnode at times which are determined in response to metering interval.

28. The method of claim 27, wherein the packet carries information for a plurality of connections.

29. The method of claim 28, wherein the packet is a data packet carrying data for a plurality of connections.

30. The method of claim 28, wherein the packet is a control packet carrying control information for a plurality of connections.

31. The method of claim 28, wherein the packet carries both data and control information, and provides carrying capability for a plurality of connections.

32. The method of claim 27, wherein at least one of the packets carries information for a plurality of connections.

33. The method of claim 27, wherein the step of placing the data packet on the network for transmission comprises the step of using a data packet that has a network-layer-independent internal format to generate a packet that has a format which is tailored to a predetermined network layer.

34. The method of claim 27, further comprising the computer-implemented step of sending an acknowledgment from the receiving endnode to the sending endnode in response to receipt of the data packet by the receiving endnode and also in response to an occurrence of an acknowledgment update event.

35. The storage medium of claim 1, wherein the method steps comprise the steps of claim 34.

36. The method of claim 27, further comprising the computer-implemented step of sending an acknowledgment in a second data packet from the receiving endnode to the sending endnode in response to receipt of a first data packet by the receiving endnode.

37. The method of claim 27, further comprising the computer-implemented step of receiving at the sending endnode an address change packet which specifies a new address for the receiving endnode, the step of placing packets on the network further comprising placing a data packet on the network for transmission to the new address.

38. A computer storage medium having a configuration that represents data and instructions which will cause at least a portion of a computer system to perform method steps for controlling the transmission of packets over a computer network between a sending endnode and a receiving endnode on the network, the packets including a plurality of data packets which are capable of carrying data over the network, the method steps comprising the steps of claim 1.

39. The storage medium of claim 38, wherein the method steps comprise the steps of claim 2.

40. The storage medium of claim 38, wherein the method steps comprise the steps of claim 4.

41. The storage medium of claim 38, wherein the method steps comprise the steps of claim 6.

42. The storage medium of claim 38, wherein the method steps comprise the steps of claim 12.

43. A computer storage medium having a configuration that represents data and instructions which will cause at least a portion of a computer system to perform method steps for controlling the transmission of packets over a computer network between a sending endnode and a receiving endnode on the network, the packets including a plurality of data packets which are capable of carrying data over the network, the method steps comprising the steps of claim 18.

44. The storage medium of claim 43, wherein the method steps comprise the steps of claim 19.

45. The storage medium of claim 43, wherein the method steps comprise the steps of claim 20.

46. The storage medium of claim 43, wherein the method steps comprise the steps of claim 26.

47. A computer storage medium having a configuration that represents data and instructions which will cause at least a portion of a computer system to perform method steps for controlling the transmission of packets over a computer network between a sending endnode and a receiving endnode on the network, the method steps comprising the steps of claim 27.

48. The storage medium of claim 47, wherein the method steps comprise the steps of claim 28.

49. A system for transmitting data packets, comprising:

a computer network including a sending endnode and a receiving endnode;

means for selecting a window size which limits the amount of outstanding data, outstanding data being data that has been sent in a data packet from the sending endnode but has not yet been acknowledged by the receiving endnode;

means for selecting a metering interval which limits the rate at which data packets are placed for transmission; and means for placing packets for transmission from the sending endnode to the receiving endnode at times which are determined in response to the window size and the metering interval.

50. The system of claim 49, wherein the means for selecting a window size comprises:

means for measuring packet throughput from the sending endnode to the receiving endnode at a plurality of different window sizes; and means for selecting the smallest window size at which the measured packet throughput is greatest.

51. The system of claim 49, wherein the means for selecting a metering interval comprises:

means for measuring interpacket gaps between packets arriving at an endnode; and means for determining the metering interval of the sending endnode based on the measured interpacket gaps.

52. A system for transmitting data packets, comprising:

a computer network including a sending endnode and a receiving endnode;

means for dynamically selecting a preferred window size which limits the amount of outstanding data by measuring packet throughput from the sending endnode to the receiving endnode and determining the preferred window size based on the measured packet throughput, outstanding data being data that has been sent in a data packet from the sending endnode but has not yet been acknowledged by the receiving endnode; and means for placing packets for transmission from the sending endnode to the receiving endnode such that the window size is an upper bound on the number of unacknowledged packets.

53. A system for transmitting data packets, comprising:

a computer network including a sending endnode and a receiving endnode;

means for associating a plurality of logical connections with a single transport session;

means for placing a packet for transmission from the sending endnode to the receiving endnode over at least one of the connections during the session; and means for selecting a metering interval which limits the rate at which packets are placed on the network, and wherein the placing means places packets on the network for transmission from the sending endnode to the receiving endnode at times which are determined in response to metering interval.

* * * * *